(12) United States Patent
Cheng et al.

(10) Patent No.: US 11,489,919 B2
(45) Date of Patent: Nov. 1, 2022

(54) METHOD, APPARATUS, AND DATA PROCESSING SYSTEM INCLUDING CONTROLLER TO MANAGE STORAGE NODES AND HOST OPERATIONS

(71) Applicant: Huawei Technologies Co., Ltd., Shenzhen (CN)

(72) Inventors: Hongcai Cheng, Hangzhou (CN); Haitao Guo, Hangzhou (CN); Hongguang Liu, Hangzhou (CN); Hao Chen, Shenzhen (CN); Sicong Li, Hangzhou (CN); Chunyi Tan, Chengdu (CN); Yu Hu, Shenzhen (CN); Can Chen, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/362,210

(22) Filed: Mar. 22, 2019

(65) Prior Publication Data
US 2019/0222649 A1 Jul. 18, 2019

Related U.S. Application Data

(63) Continuation of application No. PCT/CN2017/072701, filed on Jan. 25, 2017.

(51) Int. Cl.
*H04L 67/1097* (2022.01)
*H04L 69/16* (2022.01)
(Continued)

(52) U.S. Cl.
CPC ......... *H04L 67/1097* (2013.01); *G06F 3/061* (2013.01); *G06F 3/067* (2013.01);
(Continued)

(58) Field of Classification Search
CPC ....... H04L 67/1097; H04L 69/16; G06F 3/06; G06F 15/167; G06F 3/061; G06F 3/0635;
(Continued)

(56) References Cited

U.S. PATENT DOCUMENTS 9,229,901 B1    1/2016 Nesbit et al.
2004/0193825 A1*  9/2004 Garcia ............... G06F 12/1458
                                            711/170

(Continued)

FOREIGN PATENT DOCUMENTS

CN    103440202 A    12/2013
CN    103516755 A    1/2014
(Continued)

OTHER PUBLICATIONS

Foreign Communication From A Counterpad Application, European Application No. 17894187.8, Extended European Search Report dated Sep. 25, 2019, 10 pages.
(Continued)

*Primary Examiner* — Thomas J Dailey
(74) *Attorney, Agent, or Firm* — Conley Rose, P.C.

(57) ABSTRACT

A data processing system and method, and a corresponding apparatus, where the data processing system includes a controller and at least two storage nodes. The controller is configured to receive, using a first coupling between the controller and a host, an operation request received from the host, where the operation request includes an identity of target data and an operation type, determine at least one target storage node from the at least two storage nodes according to the identity of the target data, and send an instruction message to the at least one target storage node using a second coupling to the at least one target storage node, where the at least one target storage node is configured
(Continued)

to send the target data to the host or obtain the target data from the host according to the instruction message.

20 Claims, 16 Drawing Sheets

(51) Int. Cl.
  *G06F 15/173* (2006.01)
  *G06F 3/06* (2006.01)
  *H04L 65/40* (2022.01)

(52) U.S. Cl.
  CPC ...... *G06F 3/0659* (2013.01); *G06F 15/17331* (2013.01); *H04L 65/40* (2013.01); *H04L 69/16* (2013.01); *G06F 3/0635* (2013.01)

(58) Field of Classification Search
  CPC ... G06F 3/0659; G06F 3/067; G06F 15/17331
  See application file for complete search history.

(56) References Cited

U.S. PATENT DOCUMENTS

| | | | |
|---|---|---|---|
| 2006/0256784 A1* | 11/2006 | Feng | G06F 13/28 370/381 |
| 2007/0041383 A1* | 2/2007 | Banikazemi | H04L 69/16 370/395.3 |
| 2008/0031265 A1* | 2/2008 | Mullick | H04L 12/4641 370/401 |
| 2013/0179732 A1* | 7/2013 | Alanis | G06F 11/079 714/27 |
| 2013/0198311 A1 | 8/2013 | Tamir et al. | |
| 2015/0248366 A1 | 9/2015 | Bergsten et al. | |
| 2015/0261434 A1 | 9/2015 | Kagan et al. | |
| 2016/0267050 A1* | 9/2016 | Supnik | G06F 15/167 |
| 2017/0149920 A1 | 5/2017 | Sammatshetti | |
| 2017/0371597 A1* | 12/2017 | Jia | G06F 12/0804 |

FOREIGN PATENT DOCUMENTS

| | | |
|---|---|---|
| CN | 103530066 A | 1/2014 |
| CN | 103905526 A | 7/2014 |
| CN | 103984662 A | 8/2014 |
| CN | 104580346 A | 4/2015 |
| KR | 20170007103 A | 1/2017 |

OTHER PUBLICATIONS

Machine Translation and Abstract of Chinese Publication No. CN103440202, Dec. 11, 2013, 50 pages.
Machine Translation and Abstract of Chinese Publication No. CN103516755, Jan. 15, 2014, 27 pages.
Machine Translation and Abstract of Chinese Publication No. CN103530066, Jan. 22, 2014, 35 pages.
Machine Translation and Abstract of Chinese Publication No. CN103905526, Jul. 2, 2014, 24 pages.
Machine Translation and Abstract of Chinese Publication No. CN103984662, Aug. 13, 2014, 59 pages.
Machine Translation and Abstract of Chinese Publication No. CN104580346, Apr. 29, 2015, 26 pages.
Foreign Communication From a Counterpart Application, PCT Application No. PCT/CN2017/072701, English Translation of International Search Report dated Oct. 19, 2017, 2 pages.

* cited by examiner

METHOD, APPARATUS, AND DATA PROCESSING SYSTEM INCLUDING CONTROLLER TO MANAGE STORAGE NODES AND HOST OPERATIONS

CROSS-REFERENCE TO RELATED APPLICATIONS

This application is a continuation of International Patent Application No. PCT/CN2017/072701 filed on Jan. 25, 2017, which is hereby incorporated by reference in its entirety.

TECHNICAL FIELD

The present application relates to the field of computer technologies, and in particular, to a data processing system and method, and a corresponding apparatus.

BACKGROUND

In a computer storage system, a host may access data in a remote storage device using a controller that manages the remote storage device. However, in an access manner in the other approaches, data transmission between a host and a storage device consumes a relatively long time, and a data read/write rate of the host is easily affected.

SUMMARY

This application provides a data processing system and method, and a corresponding apparatus in order to resolve a problem that data transmitted between a host and a storage device needs to be forwarded by a controller that receives an operation request of the host, and consequently data transmission between the host and the storage device consumes a relatively long time.

A first aspect of this application provides a data processing method, where the method is executed by a controller in a data processing system, and the system includes the controller and at least two storage nodes. The controller establishes a connection to each storage node and is configured to manage the at least two storage nodes. The storage nodes and the controller establish connections to a host, and the host is configured to deploy an application service. The host sends an operation request to the controller, where the operation request includes an identity of to-be-operated target data and an operation type. The controller receives the operation request, and determines a target storage node according to the identity of the target data. The controller sends an instruction message to the target storage node, where the instruction message is used to instruct the target storage node to send the target data to the host or obtain the target data from the host using a connection to the host. The target storage node responds to the instruction message, and sends the target data to the host or obtains the target data from the host using the connection to the host.

The host and the target storage node can directly transmit data to each other using the connection between the host and the target storage node, and the data does not need to be forwarded by the controller. Therefore, a data transmission path is shortened, a time consumed in transmission is reduced, and a problem that a data read/write rate of the host is relatively low because bandwidth of the controller cannot meet a transmission requirement of a large amount of data is avoided. In addition, a problem that the data read/write rate of the host is relatively low because a computing capability of the controller cannot meet a processing requirement of a large amount of data is avoided.

In a possible implementation of the first aspect, the controller determines, according to the identity of the target data, that the target storage node includes a first storage node that stores a first data block of the target data and a second storage node that stores a second data block of the target data. The controller sends a first instruction message to the first storage node, where the first instruction message includes an identity of the first data block and is used to instruct to transmit the first data block between the first storage node and the host. The controller sends a second instruction message to the second storage node, where the second instruction message includes an identity of the second data block and is used to instruct to transmit the second data block between the second storage node and the host. According to the foregoing solution, when target data blocks are stored in multiple storage nodes, the controller can instruct the storage nodes that store the data blocks of the target data to separately send the data blocks of the target data to the host or obtain the data blocks of the target data from the host using connections to the host in order to improve a data transmission rate and reduce a time consumed in transmission.

In another possible implementation of the first aspect, when a connection between a storage node and the host is a remote direct memory access (RDMA) connection, the operation request sent by the host to the controller further includes a location parameter of a target storage area that is in a memory and that is specified by the host for the target data. The controller divides the target storage area according to the location parameter of the target storage area, and determines a location parameter of a sub storage area specified in the target storage area for a data block that is of the target data and that is corresponding to each target storage node. Then, an instruction message is generated for each target storage node, where the instruction message includes an identity of the data block, the operation type, and the location parameter of the sub storage area. After the target storage node receives the instruction message, when the operation type in the instruction message is a read operation, the target storage node writes the data block of the target data into the sub storage area in the memory of the host according to the location parameter of the sub storage area and using the RDMA connection to the host, or when the operation type in the instruction message is a write operation, the target storage node reads the data block of the target data from the sub storage area in the memory of the host according to the location parameter of the sub storage area and using the RDMA connection to the host, and stores the data block. According to the foregoing solution, when target data blocks are stored in multiple storage nodes, the controller can determine, for each target storage node, a storage area that is in the memory of the host and that is corresponding to a data block stored in the target storage node, and instruct the storage node to quickly read the data block of the target data from the memory of the host or write the data block of the target data into the memory of the host using an RDMA connection to the host in order to improve a data transmission rate and reduce a time consumed in transmission.

In another possible implementation of the first aspect, when a connection between a storage node and the host is an RDMA connection, the storage node creates a first queue pair (QP), where the first QP includes a first send queue (SQ) and a first receive queue (RQ). Then, the storage node sends a parameter of the first QP to the controller using a first connection. The controller sends the parameter of the first QP to the host using a second connection. The host creates a second QP, where the second QP includes a second SQ and a second RQ, and sends a parameter of the second QP to the controller using the second connection. The controller sends the parameter of the second QP to the storage node using the first connection. The host associates the second QP with the first QP of the storage node according to the received parameter of the first QP. The storage node binds the first SQ of the first QP to the second RQ of the second QP and binds the first RQ of the first QP to the second SQ of the second QP according to the received parameter of the second QP. According to the foregoing solution, the storage node and the host can establish the RDMA connection with assistance of the controller, and further, data can be transmitted using the RDMA connection and does not need to be forwarded by the controller in order to improve a data transmission rate and reduce a time consumed in data transmission.

In another possible implementation of the first aspect, the host establishes Transmission Control Protocol (TCP)/Internet Protocol (IP) connections to the controller and the at least two storage nodes. After sending the instruction message to the target storage node, the controller sends a third instruction message to the host, where the third instruction message includes a communication address of the target storage node and is used to instruct the host to transmit, using a TCP/IP connection to the target storage node, the target data. According to the foregoing solution, the controller not only sends an instruction message to a packet transmit end, but also sends an instruction message to a packet receive end such that the packet receive end can obtain target data from a received TCP/IP packet, instead of discarding the packet.

In another possible implementation of the first aspect, the host establishes TCP/IP connections to the controller and the at least two storage nodes, and the operation type in the operation request sent by the host to the controller is a read operation. The controller adds the operation type, a communication address of the host, a communication address of the controller, and the identity of the target data to the instruction message sent to the target storage node in order to instruct the target storage node to send, using the communication address of the controller as a source address and using the communication address of the host as a destination address, a TCP/IP packet that carries the target data. According to the foregoing solution, the target storage node modifies a source address for sending a packet, and masquerades as the controller to send the packet that carries the target data to the host. Therefore, without changing the existing host, the storage node directly sends the data to the host using the TCP/IP connection to the host in order to improve a data transmission speed between the host and the storage node and reduce a time consumed in data transmission.

In another possible implementation of the first aspect, the controller determines a acceptable data amount of the host according to a TCP window size of the host, and determines, according to the acceptable data amount, a data block that is of the target data and that is added to each TCP/IP packet by the target storage node, where a size of the data block is not greater than the TCP window size of the host. Then, the controller generates the instruction message that includes an identity of the data block, and sends the instruction message to the target storage node. According to the foregoing solution, the controller can determine, according to the TCP window size of the host, a data block sent to the host each time, and instruct a storage node that stores the data block to send, using a TCP/IP packet, the data block to the host.

Further, data is sent to the host using a TCP connection between the storage node and the host.

In another possible implementation of the first aspect, after sending the target data to the host or obtaining the target data from the host, the target storage node sends a data transmission success message to the controller. After receiving data transmission success messages sent by all target storage nodes, the controller sends an operation success message to the host. According to the foregoing solution, the controller can notify the host of a data read/write success after transmission of the target data between the target storage node and the host is completed.

A second aspect of this application provides a data processing method, where the method is executed by a storage node in a data processing system. The system includes a controller and at least two storage nodes. The controller establishes a connection to each storage node and is configured to manage the at least two storage nodes. The storage nodes and the controller establish connections to a host, and the host is configured to deploy an application service. The method includes establishing, by the storage node, a connection to the host, where the host is configured to deploy the application service, receiving, by the storage node, an instruction message sent by the controller, where the instruction message includes an identity of to-be-operated data of the host and an operation type, and sending, by the storage node, the target data to the host or obtaining the target data from the host according to the instruction message and using the connection to the host.

In a possible implementation of the second aspect, the storage node establishes an RDMA connection to the host, and a connection establishment procedure is creating, by the storage node, a first QP, and sending a parameter of the first QP to the controller using a first connection, sending, by the controller, the parameter of the first QP to the host using a second connection, creating, by the host, a second QP, and sending a parameter of the second QP to the controller using the second connection, sending, by the controller, the parameter of the second QP to the storage node using the first connection, associating, by the host, the second QP with the first QP of the storage node according to the received parameter of the first QP, and associating, by the storage node, the first QP of the storage node with the second QP according to the received parameter of the second QP. According to the foregoing solution, the storage node and the host can establish the RDMA connection with assistance of the controller, and further, data can be transmitted using the RDMA connection and does not need to be forwarded by the controller in order to improve a data transmission rate and reduce a time consumed in data transmission.

In another possible implementation of the second aspect, the instruction message sent by the controller includes the identity of the target data, the operation type, and a location parameter of a target storage area in the host. The storage node responds to the instruction message. When the operation type in the instruction message is a read operation, the storage node writes the target data into the target storage area in a memory of the host using the RDMA connection to the host, or when the operation type in the instruction message is a write operation, the storage node reads the target data from the target storage area in a memory of the host using the RDMA connection to the host, and stores the target data. According to the foregoing solution, the target storage node can read the data from or write the data into the memory of the host using the RDMA connection to the host in order to complete transmission of the target data between the target storage node and the host.

In another possible implementation of the second aspect, the host establishes a TCP/IP connection to the storage node, and the operation type in the operation request sent by the host to the controller is a read operation. The controller adds the operation type, a communication address of the host, a communication address of the controller, and the identity of the target data to the instruction message sent to the target storage node. The target storage node responds to the instruction message, and sends, using the communication address of the controller as a source address and using the communication address of the host as a destination address, a TCP/IP packet that carries the target data. According to the foregoing solution, the target storage node modifies a source address for sending a packet, and masquerades as the controller to send the packet that carries the target data to the host. Therefore, without changing the existing host, the storage node directly sends the data to the host using the TCP/IP connection to the host in order to improve a data transmission speed between the host and the storage node and reduce a time consumed in data transmission.

A third aspect of this application provides a data processing method, where the method is executed by a first controller in a data processing system. The system includes at least two controllers and at least two magnetic disks. The at least two controllers are configured to manage the at least two magnetic disks. Each logical unit number (LUN) of the at least two magnetic disks may be homed to one controller. The at least two controllers and the at least two magnetic disks form a storage array. A host may access, using a controller, target data of a LUN managed by the controller. The at least two controllers establish connections to the host, and the host is configured to deploy an application service. The method includes receiving, by the first controller, an operation request sent by the host, where the operation request includes an identity of to-be-operated target data and an operation type, determining, by the first controller according to a preset load balancing policy or homing of a LUN of the target data, a second controller that is to respond to the operation request, and sending an instruction message to the second controller, to instruct the second controller to send the target data to the host or obtain the target data from the host using a connection to the host. According to the foregoing solution, the target data may be transmitted between the host and the second controller using the connection between the host and the second controller that is responsible for providing the host with a service of reading/writing the target data, and the target data does not need to be forwarded by the first controller that receives the operation request of the host, thereby shortening a length of a data transmission path and reducing a time consumed in transmission of the target data.

In a possible implementation of the third aspect, the connection between the second controller and the host is an RDMA connection. The operation request sent by the host to the first controller further includes a location parameter of a target storage area in the host. The first controller adds, to the instruction message sent to the second controller, the identity of the target data, the operation type, and the location parameter in order to instruct the second controller to obtain the target data from the at least two magnetic disks, and write the target data into the target storage area in a memory of the host using the RDMA connection to the host when the operation type is a read operation, or read the target data from the target storage area in a memory of the host using the RDMA connection to the host, and write the target data into the at least two magnetic disks when the operation type is a write operation. According to the foregoing solution, the target data may be quickly transmitted between the host and the second controller using the RDMA connection established between the host and the second controller that is responsible for providing the host with a service of reading/writing the target data in order to implement high-rate data read/write.

In another possible implementation of the third aspect, the first controller determines, according to the preset load balancing policy, that the second controller is to send the target data to the host or obtain the target data from the host, or determines, according to the homing of the LUN of the target data, that the second controller is to send the target data to the host or obtain the target data from the host.

In another possible implementation of the third aspect, the first controller receives a fourth instruction message of a third controller that manages the at least two magnetic disks, where the fourth instruction message includes an identity of second to-be-operated target data of the host and an operation type. The first controller responds to the fourth instruction message, and sends the second target data to the host or obtains the second target data from the host using a connection to the host.

A fourth aspect of this application provides a data processing apparatus. The apparatus is configured to execute the method in the first aspect or any possible implementation of the first aspect. Further, the apparatus includes a module configured to execute the method in the first aspect or any possible implementation of the first aspect.

A fifth aspect of this application provides a data processing apparatus. The apparatus is configured to execute the method in the second aspect or any possible implementation of the second aspect. Further, the apparatus includes a module configured to execute the method in the second aspect or any possible implementation of the second aspect.

A sixth aspect of this application provides a data processing apparatus. The apparatus is configured to execute the method in the third aspect or any possible implementation of the third aspect. Further, the apparatus includes a module configured to execute the method in the third aspect or any possible implementation of the third aspect.

A seventh aspect of this application provides a data processing device, including a processor, a storage, a communications interface, and a bus. The processor, the storage, and the communications interface connect to and communicate with each other using the bus. The storage is configured to store a computer-executable instruction. When the device runs, the processor executes the computer-executable instruction in the storage to execute, using a hardware resource on the device, the method in the first aspect or any possible implementation of the first aspect.

An eighth aspect of this application provides a data processing device, including a processor, a storage, a communications interface, and a bus. The processor, the storage, and the communications interface connect to and communicate with each other using the bus. The storage is configured to store a computer-executable instruction. When the device runs, the processor executes the computer-executable instruction in the storage to execute, using a hardware resource on the device, the method in the second aspect or any possible implementation of the second aspect.

A ninth aspect of this application provides a data processing device, including a processor, a storage, a communications interface, and a bus. The processor, the storage, and the communications interface connect to and communicate with each other using the bus. The storage is configured to store a computer-executable instruction. When the device runs, the processor executes the computer-executable instruction in the storage to execute, using a hardware resource on the device, the method in the third aspect or any possible implementation of the third aspect.

A tenth aspect of this application provides a data processing system. The system includes the device in the seventh aspect and at least two devices in the eighth aspect, and is configured to implement direct data transmission between the device in the eighth aspect and a host using a connection between the device in the eighth aspect and the host, without a need of forwarding data by the device in the seventh aspect.

An eleventh aspect of this application provides a data processing system. The system includes at least two devices in the ninth aspect and at least two magnetic disks, and is configured to implement, using a connection between a host and the device in the ninth aspect that responds to an operation request of the host, direct data transmission between the device in the ninth aspect and the host, without a need of forwarding data by a device that receives the operation request of the host.

A twelfth aspect of this application provides a computer-readable medium. The computer-readable storage medium stores an instruction. When the instruction runs on a computer, the computer executes an instruction in the method in the first aspect or any possible implementation of the first aspect.

A thirteenth aspect of this application provides a computer-readable medium. The computer-readable storage medium stores an instruction. When the instruction runs on a computer, the computer executes an instruction in the method in the second aspect or any possible implementation of the second aspect.

A fourteenth aspect of this application provides a computer-readable medium. The computer-readable storage medium stores an instruction. When the instruction runs on a computer, the computer executes an instruction in the method in the third aspect or any possible implementation of the third aspect.

Based on the implementations provided in the foregoing aspects, the implementations may be further combined in this application to provide more implementations.

BRIEF DESCRIPTION OF DRAWINGS

To describe the technical solutions in some of the embodiments of the present application more clearly, the following briefly describes the accompanying drawings describing some of the embodiments.

DESCRIPTION OF EMBODIMENTS

For ease of understanding, the following first describes a technical solution for accessing data in a remote storage device by a host.

Figure 1:
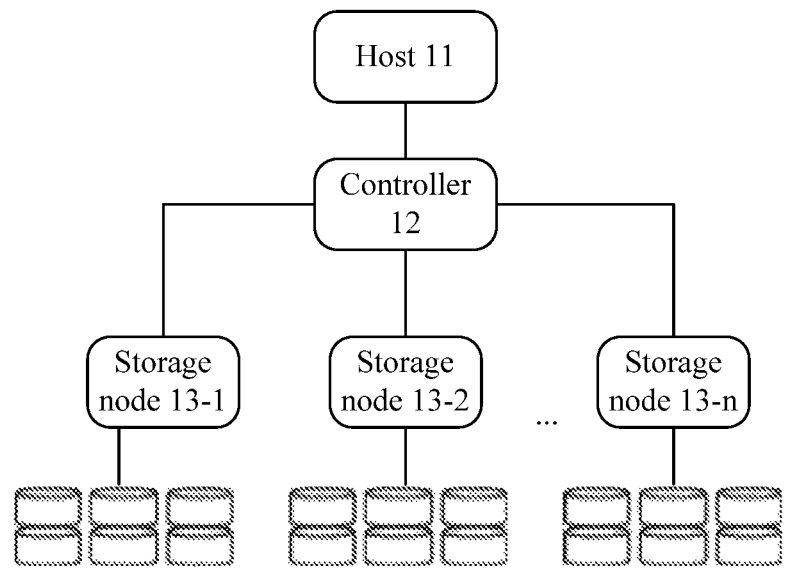
FIG. 1 is a schematic diagram of a storage area network (SAN) storage system.

FIG. 1 is a schematic diagram of a distributed SAN system. The system includes a controller 12 and at least two storage nodes, such as a storage node 13-1, a storage node 13-2, ..., and a storage node 13-n. The system is configured to process a request message of a host 11. The host 11 establishes a network connection to the controller 12, such as a connection based on a fibre channel (FC) or an Ethernet-based connection. The host 11 sends an operation request to the controller 12 using the connection to the controller 12. The controller 12 establishes network connections to the at least two storage nodes. In the SAN system, data is stored in a distributed manner. When data needs to be written into the SAN system, the controller splits the data into multiple data blocks according to a preset algorithm, and stores the multiple data blocks in different storage nodes. The controller 12 records information about data stored in each storage node. The information is also referred to as a partitioned view of the storage node. For example, Table 1 is an example of a partitioned view in a storage node. Referring to Table 1, Table 1 includes identities of data blocks, identities of associated original data, storage media, and check values. A check value is check information that is of a data block and that is calculated by the control node according to a preset algorithm, and is used to determine data block integrity when the data block is read or written. A storage medium is configured to identify information about a target storage medium that is in the storage node and that stores a data block.

TABLE 1

Example of a partitioned view in a storage node

| Identity of a data block | Identity of associated original data | Storage medium | Check value |
| --- | --- | --- | --- |
| Data block 11 | Data 1 | Storage medium 1 | Check value 1 |
| Data block 21 | Data 2 | Storage medium 2 | Check value 2 |
| Data block 31 | Data 3 | Storage medium 3 | Check value 3 |

Optionally, when data is stored in the SAN system in a distributed manner, the controller stores a global view of storage nodes in the SAN system. The global view records information about data stored in each storage node. For example, Table 2 is an example of a global view.

TABLE 2

Example of a global view on a control node

| Identity of a data block | Identity of associated original data | Check value | Storage node | Storage medium |
| --- | --- | --- | --- | --- |
| Data block 11 | Data 1 | Check value 1 | Storage node 1 | Storage medium 1 |
| Data block 12 | Data 1 | Check value 2 | Storage node 2 | Storage medium 1 |
| Data block 13 | Data 1 | Check value 3 | Storage node 3 | Storage medium 1 |

When receiving a read request sent by the host 11, the controller 12 determines, according to an identity of to-be-operated target data in the read request and the partitioned view, a target storage node that stores the target data (for example, the target storage node is the storage node 13-1). Then, the controller 12 sends the read request to the target storage node 13-1. For the read request sent by the controller 12, the target storage node 13-1 returns the target data to the controller 12. The controller 12 receives the target data returned by the target storage node 13-1, and returns the target data to the host 11.

When receiving a write request sent by the host 11, the controller 12 determines, according to an identity of to-be-operated target data in the write request and the partitioned view, the target storage node 13-1 that stores the target data. Then, the controller 12 sends the write request to the target storage node. For the write request sent by the controller 12, the target storage node 13-1 writes the target data into a storage medium, and returns a data write response message to the controller 12. When the response message received by the controller 12 indicates data write success, the controller 12 returns a write operation success message to the host 11.

It can be learned from the foregoing process that the controller needs to forward the to-be-operated data regardless of a scenario in which the host reads the data from the storage node or a scenario in which the host writes the data into the storage node. In addition, when forwarding the to-be-operated data, the controller needs to process the data, for example, packetize or depacketize the data. In an actual case, the SAN system may be used to process operation requests of multiple hosts. In this case, the controller may simultaneously process operation requests of multiple hosts for a storage node. Consequently, data transmission burden and computing burden of the controller are excessively heavy, limiting a speed of data read/write between the hosts and the storage node.

To resolve the foregoing problem that the controller receiving the operation requests of the hosts limits the speed of the data read/write between the hosts and the storage node and increases a time consumed in the data read/write between the hosts and the storage node, an embodiment of the present application provides a data processing system. The following describes the data processing system in detail with reference to the accompanying drawings and specific embodiments.

First, some concepts mentioned in the embodiments of the present application are described.

(1) RDMA is a technology for directly performing remote memory access. Using this technology, data can be directly and quickly migrated from a storage of a device to a storage of another remote device. This reduces consumption generated when a central processing unit (CPU) of the device participates in a data transmission procedure, and therefore, improves service processing performance of a system. The technology is characterized by high bandwidth, a low delay, and low CPU usage.

(2) A QP includes an SQ and an RQ. QPs need to be separately created at two ends between which an RDMA connection is to be established. Then, one end associates an SQ in a QP of the end with an RQ in a QP of a peer end, and associates an RQ in the QP of the end with an SQ in the QP of the peer end in order to associate the QP of the end with the QP of the peer end and establish the RDMA connection between the two ends.

(3) An RDMA enabled network interface card (RNIC) is configured to implement data transmission based on an RDMA connection. During data transmission that is based on an RDMA connection and that is between a device A and a device B, an RNIC of the device A may directly read data from a memory of the device A, and send the data obtained by reading to an RNIC of the device B. The RNIC of the device B writes the data received from the RNIC of the device A into a memory of the device B. In the embodiments of the present application, the RNIC may be a host bus adapter (HBA) that supports RDMA.

(4) An RDMA operation type includes RDMA send and RDMA receive that are used to transmit a command, and RDMA read and RDMA write that are used to transmit data. For specific implementations of the foregoing four operation types, refer to the other approaches. Details are not described herein.

(5) An iSER connection is a connection based on iSER. The iSER protocol supports RDMA transmission.

(6) For a non-volatile memory (NVM) express (NVMe) over Fabric (NOF) connection, NVMe refers to NVMe, and an NOF protocol supports RDMA transmission.

(7) An SGL is a data encapsulation form. In an RDMA data transmission procedure, it is required that both a source physical address and a target physical address should be continuous. However, in an actual case, a storage address of data is not necessarily continuous in physical space. In this case, a discontinuous physical storage address is encapsulated in a form of an SGL. After transmitting a data block stored in physically continuous storage space, a device transmits, according to the SGL, a next data block stored in physically continuous storage space.

Figure 2:
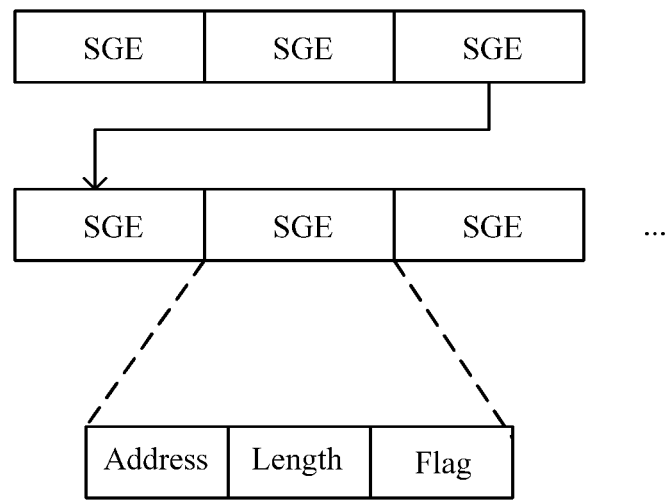
FIG. 2 is a schematic diagram of a scatter gather list (SGL)

FIG. 2 is a schematic diagram of an SGL including scatter gather entries (SGEs). The SGL includes multiple SGE. Each SGE includes an address field, a length field, and a flag field. The address field indicates a start location of a storage area. The length field indicates a length of the storage area. The flag field indicates whether the SGE is the last one in the SGL. The flag field may further include other assistance information, such as a data block descriptor. Each SGE indicates a continuous storage area according to the address field and the length field that are included in the SGE. If storage areas indicated by several SGEs are sequentially connected, the SGEs form a group. Storage areas indicated by SGEs in different groups in the SGL are not adjacent to each other. The last SGE in each group of SGEs points to a start address of a next group of SGEs.

(8) A LUN is merely a number identity and does not represent any entity attribute. In a storage array, multiple magnetic disks form a logical disk according to a preset algorithm (such as a redundant array of independent disks (RAID) configuration relationship). Then, the logical disk is split into different strips according to a preset rule. Each strip is referred to as a LUN. The LUN may be used to describe a continuous storage area of a magnetic disk in the storage array, or describe a set of multiple discontinuous storage areas of a magnetic disk, or describe a set of storage areas in multiple magnetic disks.

Figure 3:
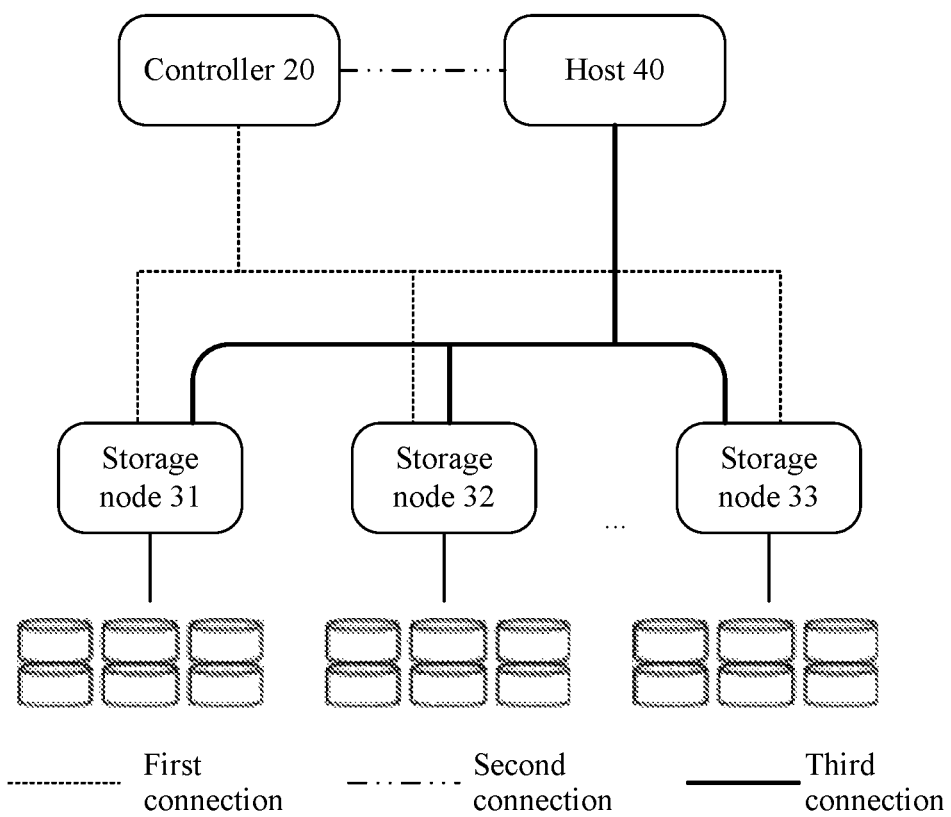
FIG. 3 is a schematic diagram of a SAN system according to an embodiment of the present application.

FIG. 3 is a schematic diagram of a distributed storage system according to an embodiment of the present application. The system includes a host 40, a controller 20, and at least two storage nodes managed by the controller 20, such as a storage node 31, a storage node 32, and a storage node 33. The controller 20 separately establishes connections to the storage node 31, the storage node 32, and the storage node 33. The controller 20 establishes a connection to the host 40. The storage node 31, the storage node 32, and the storage node 33 separately establish connections to the host 40. The host 40 is configured to deploy an application service.

For ease of distinguishing, in this embodiment of the present application, a connection between the controller 20 and a storage node is referred to as a first connection, the connection between the controller 20 and the host 40 is referred to as a second connection, and a connection between a storage node and the host 40 is referred to as a third connection. The first connection, the second connection, and the third connection may be connections based on wired communication, such as FC-based connections. Alternatively, the first connection, the second connection, and the third connection may be connections based on wireless communication, such as connections based on cellular communication or connections based on WI-FI.

Figure 4:
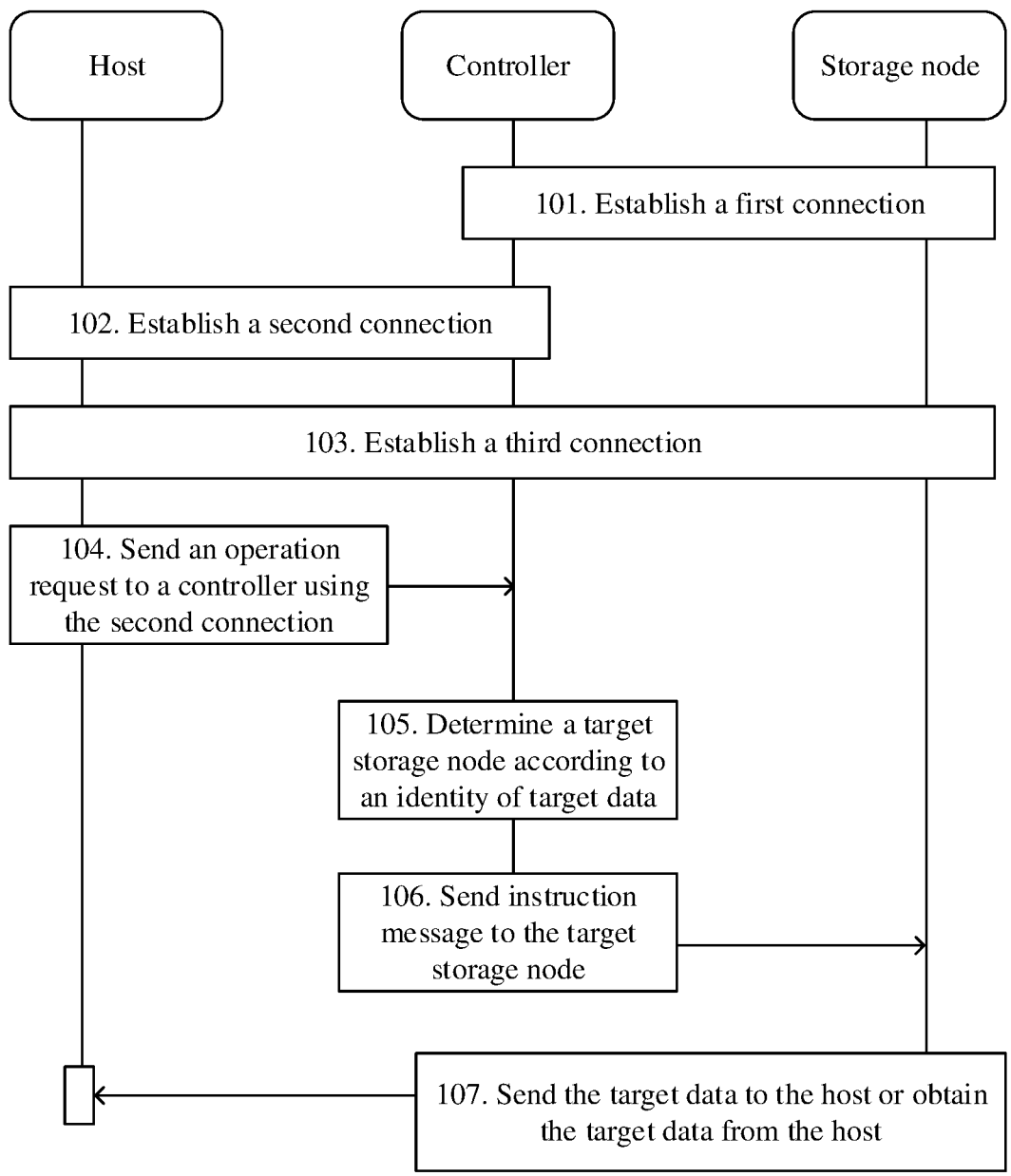
FIG. 4 is a schematic flowchart of a data transmission method in a SAN system according to an embodiment of the present application.

FIG. 4 shows a method for processing data according to the system shown in FIG. 3. The method includes the following steps.

Step 101. A controller establishes first connections to storage nodes.

There are two or more storage nodes. The controller establishes a first connection to each storage node. The controller is configured to manage the storage nodes using the first connections to the storage nodes. For example, the controller instructs, according to a request of a host, a storage node to store/return/delete data.

Step 102. The controller establishes a second connection to a host.

Step 103. The host establishes third connections to the storage nodes.

Step 104. The host sends an operation request to the controller using the second connection, where the operation request includes an identity of to-be-operated target data and an operation type.

In this embodiment of the present application, a read request and a write request are collectively referred to as an operation request. The operation request includes the operation type, used to indicate whether a requested operation is a read operation or a write operation. The identity of the target data is used to uniquely identify the target data. For example, when data is stored in a key-value pair manner, a key value is an identity of the data.

Step 105. The controller receives the operation request, and determines a target storage node according to the identity of the target data and a global view or a partitioned view.

The controller obtains the identity of the target data from the operation request, and determines the target storage node according to the identity of the target data and the global view or the partitioned view. When the operation type in the operation request is a write operation, the target storage node is a storage node into which the target data is to be written, or when the operation type in the operation request is a read operation, the target storage node is a storage node that stores the target data.

For example, when the operation type in the operation request is a read operation, the controller searches the global view or the partitioned view for the identity of the target data, and determines the target storage node that stores the target data. There may be one or more target storage nodes. For example, the target data is split into multiple data blocks, and the multiple data blocks are separately stored in multiple storage nodes.

For another example, when the operation type in the operation request is a write operation, the controller splits to-be-written data into multiple data blocks according to a preset algorithm, and separately stores the multiple data blocks in multiple storage nodes. In this case, each storage node that stores a data block is a target storage node configured to store the target data.

Step 106. The controller sends an instruction message to the target storage node, where the instruction message is used to instruct the target storage node to send the target data to the host or obtain the target data from the host using a connection to the host.

In an optional manner, when there are multiple target storage nodes, the controller may send instruction messages to the multiple target storage nodes, to instruct each target storage node transmit, using a third connection to the host, a data block of the target data. Because data blocks of the target data may be simultaneously transmitted between the multiple target storage nodes and the host according to the instruction messages, transmission efficiency of the target data can be improved, and a time consumed in transmission of the target data can be reduced.

In another optional manner, the controller sequentially sends the instruction messages to the multiple target storage nodes, that is, sends an instruction message to a next target storage node after data transmission between a previous target storage node and the host is completed. According to the foregoing solution, the controller can control orderly transmission of the target data and ensure correctness of transmitted data.

Step 107. The target storage node sends the target data to the host or obtains the target data from the host according to the instruction message sent by the controller.

According to the foregoing solution, the host instructs, using the controller, the target storage node to send the target data to the host or obtain the target data from the host. In addition, the target data is directly transmitted between the target storage node and the host using the connection between the target storage node and the host, and the data does not need to be forwarded by the controller. Therefore, a data transmission path is shortened, a time consumed in transmission is reduced, and a problem that a data read/write rate of the host is relatively low because bandwidth of the controller cannot meet a transmission requirement of a large amount of data is avoided. In addition, a problem that the data read/write rate of the host is relatively low because a computing capability of the controller cannot meet a processing requirement of a large amount of data is avoided.

Further, in this embodiment of the present application, a third connection established between the host and a storage node may be implemented in multiple manners. The following separately provides description.

(1) The third connection is an RDMA connection.

Figure 5:
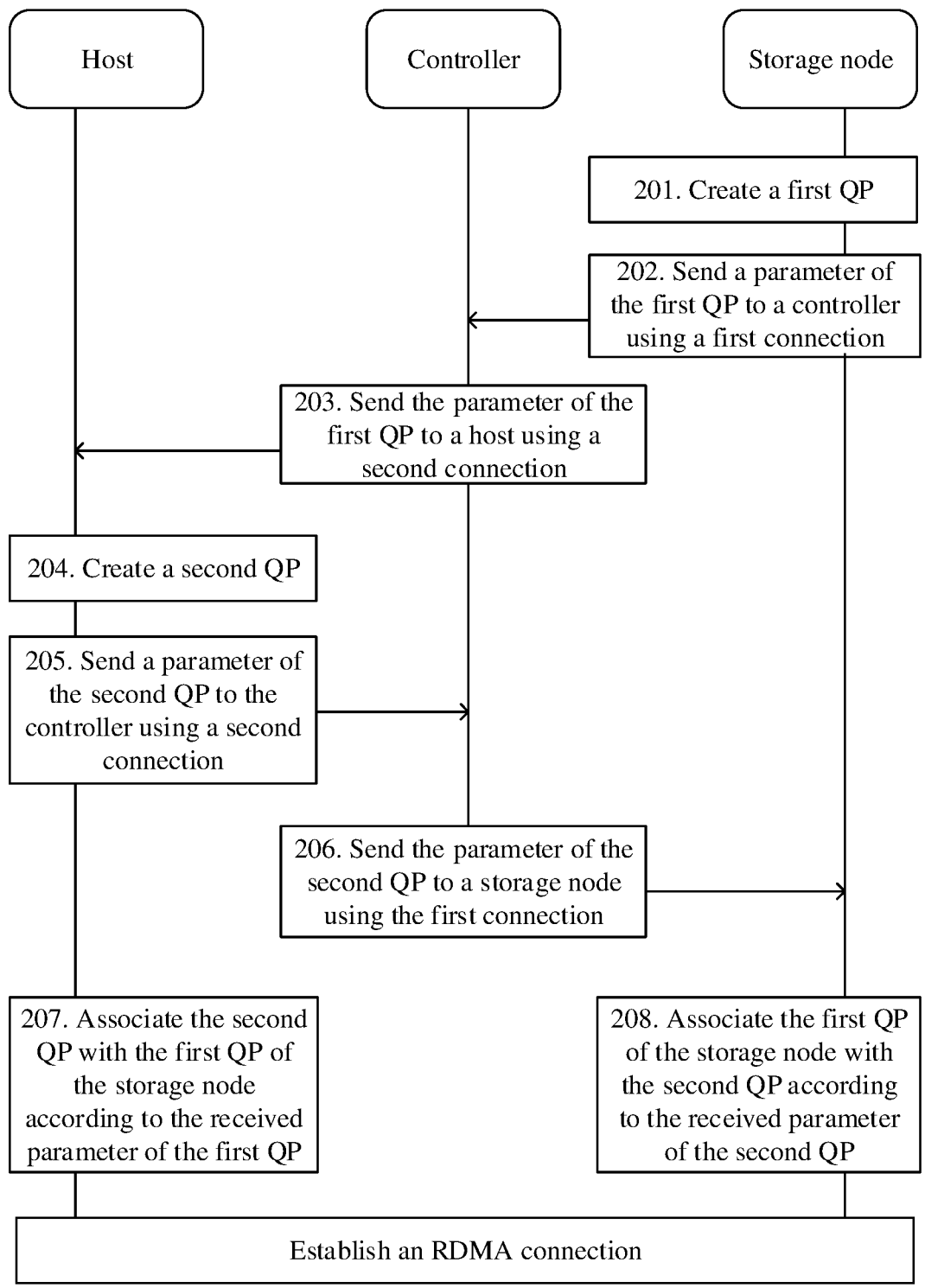
FIG. 5 is a schematic flowchart of establishing an RDMA connection between a host and a storage node according to an embodiment of the present application.

Referring to FIG. 5, a procedure of establishing an RDMA connection between a host and a storage node is as follows.

Step 201. A storage node creates a first QP.

For ease of distinguishing, in this embodiment of the present application, a QP created by the storage node is referred to as the first QP. The first QP includes an SQ and a RQ. The SQ is used to send data, and the RQ is used to receive data. Optionally, the first QP further includes a completion queue. The completion queue is used to detect whether a data sending task of the SQ of the first QP and a data receiving task of the RQ of the first QP are completed.

Step 202. The storage node sends a parameter of the first QP to a controller using a first connection.

The parameter of the first QP may include an identity of the first QP. The identity of the first QP may be a number, a letter, or a combination in another form that is used to identify the QP. In addition, the parameter of the first QP may include an identity of a protection domain (PD) configured for the first QP. The PD is used to indicate a network interface card (such as an RNIC) that has an RDMA function and that is allocated to the RDMA connection by the storage node. The parameter of the first QP may further include an identity of a connection manager (CM) that is allocated by the storage node and that helps establish the RDMA connection and manages the RDMA connection.

Step 203. The controller sends the parameter of the first QP to a host using a second connection.

Step 204. The host creates a second QP.

For ease of distinguishing, in this embodiment of the present application, a QP created by the host is referred to as the second QP. The second QP includes an SQ and an RQ. Optionally, the second QP further includes a completion queue. The completion queue is used to detect whether a data sending task of the SQ of the second QP and a data receiving task of the RQ of the second QP are completed.

Step 205. The host sends a parameter of the second QP to the controller using the second connection.

The parameter of the second QP may include an identity of the second QP. In addition, the parameter of the second QP may include an identity of a PD configured for the second QP, an identity of a CM configured for the second QP, and the like.

Step 206. The controller sends the parameter of the second QP to the storage node using the first connection.

Step 207. The host associates the second QP with the first QP of the storage node according to the received parameter of the first QP.

Step 208. The storage node associates the first QP of the storage node with the second QP according to the received parameter of the second QP.

The associating the first QP with the second QP includes, according to the identity of the first QP and the identity of the second QP, binding the SQ of the first QP to the RQ of the second QP in order to create a channel for sending data from the storage node to the host, and binding the RQ of the first QP to the SQ of the second QP in order to create a channel for sending data from the host to the storage node.

It should be noted that step 201 of creating the first QP by the storage node and step 204 of creating the second QP by the host may be performed simultaneously, or step 201 may be performed before step 204, or step 204 may be performed before step 201.

According to the foregoing solution, the host can establish the RDMA connection to the storage node. Because the RDMA connection is a connection directly established between the host and the storage node, target data is transmitted between the host and the storage node using the RDMA connection and does not need to be forwarded. Therefore, a time consumed in transmission can be reduced. In addition, a transmission rate of the RDMA connection is high, and therefore, the time consumed in transmission can be further reduced.

Figure 6:
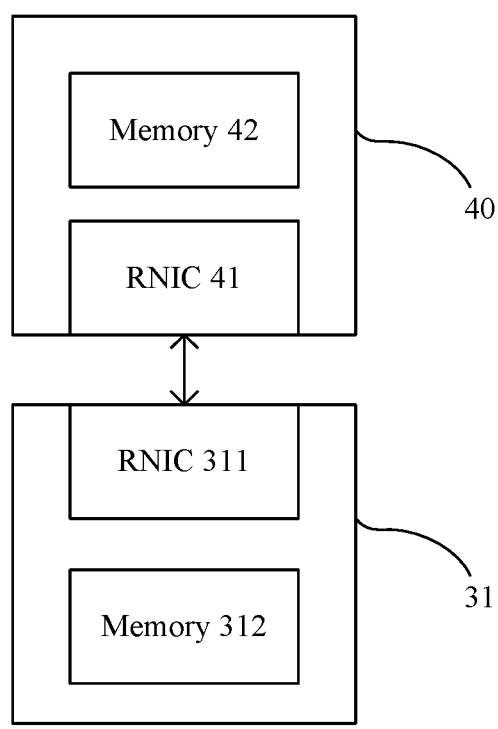
FIG. 6 is a schematic structural diagram of a storage node and a host according to an embodiment of the present application.

Next, an implementation of data transmission between a storage node and a host based on an RDMA connection is further described with reference to FIG. 6. FIG. 6 is a schematic diagram of data transmission between a host 40 and a storage node 31 using an RDMA connection. The host 40 includes an RNIC 41 (such as an HBA card) and a memory 42. The storage node 31 includes an RNIC 311 and a memory 312.

The RNIC 311 of the storage node 31 may send, to the RNIC 41 of the host 40, a request for reading data from a specified location in the memory 42. The RNIC 41 reads the data from the specified location in the memory 42, and sends the data to the RNIC 311. The RNIC 311 writes the received data into the memory 312. The foregoing procedure is referred to as reading data from the host 40 by the storage node 31 in an RDMA read manner.

Alternatively, the RNIC 311 of the storage node 31 may send, to the RNIC 41 of the host 40, a request for writing data into a specified location in the memory 42. The RNIC 41 caches the data carried in the request, and writes the data into the location that is in the memory 42 and that is specified in the request. The foregoing procedure is referred to as writing data into the host 40 by the storage node 31 in an RDMA write manner.

Figure 7:
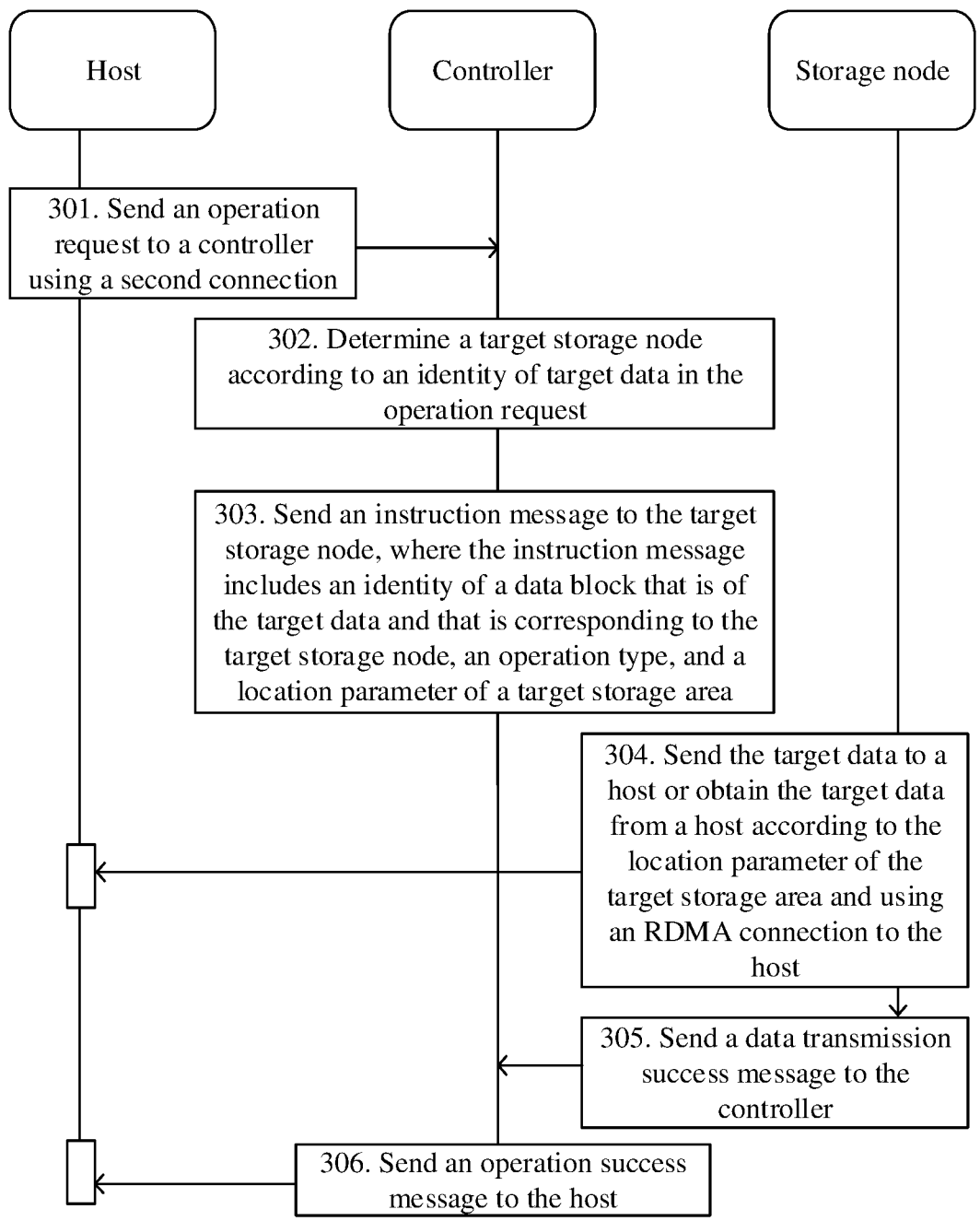
FIG. 7 is a schematic flowchart of transmitting target data between a host and a storage node using an RDMA connection according to an embodiment of the present application.

Further, FIG. 7 is a schematic flowchart of a data processing method based on an RDMA connection. The method includes the following steps.

Step 301. A host sends an operation request to a controller using a second connection, where the operation request includes an operation type, an identity of target data, and a location parameter of a target storage area that is in a memory and that is specified by the host for the target data.

The location parameter of the target storage area is used to identify a storage location of the target data in the memory of the host. The location parameter may be presented in a form of offset in the memory. The operation request may further include information such as a length of the target data and a remote key (Rkey).

Step 302. The controller receives the operation request, and determines a target storage node according to the identity of the target data in the operation request.

When the operation request is a write request, the target storage node is a storage node into which the target data is to be written, or when the operation request is a read request, the target storage node is a storage node that stores the target data.

Step 303. The controller sends an instruction message to the target storage node, where the instruction message includes an identity of a data block that is of the target data and that is corresponding to the target storage node, the operation type, and the location parameter of the target storage area.

Step 304. The target storage node responds to the instruction message, and sends the target data to the host or obtains the target data from the host according to the location parameter of the target storage area and using an RDMA connection to the host.

Further, when the operation type in the instruction message is a write operation, the target storage node reads the target data from the target storage area in the memory of the host in RDMA read manner. Then, the target storage node writes the target data that is obtained by reading into a magnetic disk of the target storage node.

When the operation type in the instruction message is a read operation, the target storage node writes the target data into the target storage area in the memory of the host in the foregoing RDMA write manner. Then, the host writes, into a magnetic disk of the host, the target data that is stored in the target storage area in the memory of the host.

Step 305. After sending the target data to the host or obtaining the target data from the host using the RDMA connection, the target storage node sends a data transmission success message to the controller.

When the operation type is a write operation, after reading the data from the target storage area in the memory of the host in the RDMA read manner, the target storage node sends the data transmission success message to the controller, or when the operation type is a read operation, after writing the stored target data into the target storage area in the memory of the host in the RDMA write manner, the target storage node sends the data transmission success message to the controller.

Step 306. After receiving the data transmission success message sent by the target storage node, the controller sends an operation success message to the host.

According to the foregoing solution, the to-be-operated data is transmitted using the RDMA connection between the host and the storage node, without a need of the controller. Therefore, bandwidth burden and computing burden of the controller are reduced. In addition, because data transmission is implemented using the high-speed RDMA connection, a data transmission rate is higher, and a time consumed in an entire data write procedure is shorter.

In an optional manner, the target data is split into multiple data blocks. Storage areas that are in a magnetic disk of the target storage node and that are corresponding to different data blocks are discontinuous. Further, there may be two scenarios.

Scenario 1: The target data corresponds to more than one target storage node. Different data blocks of the target data may be corresponding to different target storage nodes. For example, the target data is split into a first data block and a second data block, the first data block corresponds to a first storage node, and the second data block corresponds to a second storage node.

Scenario 2: The target data corresponds to one target storage node. However, storage areas that are in a magnetic disk of the target storage node and that are corresponding to different data blocks of the target data are discontinuous. For example, the target data is split into a first data block and a second data block, the first data block corresponds to a first storage area in the target storage node, the second data block corresponds to a second storage area in the target storage node, and the first storage area and the second storage area are discontinuous.

In the foregoing two scenarios, the controller further needs to determine, for each data block of the target data, a corresponding sub storage area in the target storage area in the memory of the host, and further instructs the target storage node to obtain the data block of the target data from the sub storage area or write the data block of the target data into the sub storage area in the memory of the host. The following provides description using the scenario 1 as an example.

Figure 8A:
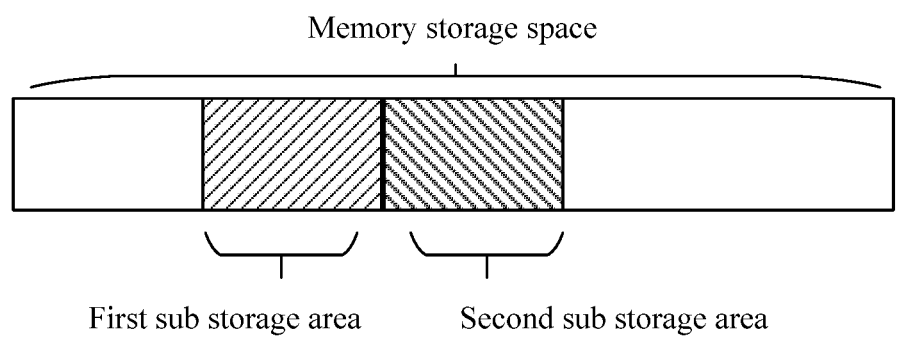
FIG. 8A and FIG. 8B are schematic diagrams of a storage area that is in a memory of a host and that stores target data according to an embodiment of the present application.

Referring to FIG. 8A, when a target storage area that is in the memory and that is specified by the host for the target data is a continuous storage area, the controller determines that the first data block of the target data is to be stored in the first storage node, determines, by division, a first sub storage area from the storage area of the target data in the memory to store the first data block, determines that the second data block of the target data is to be stored in the second storage node, and determines, by division, a second sub storage area from the storage area of the target data in the memory to store the second data block. The first sub storage area and the second sub storage area are continuous storage areas.

Figure 8B:
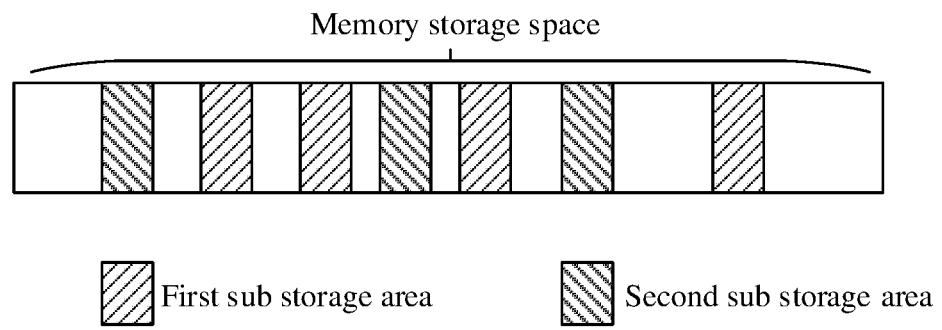

Referring to FIG. 8B, when the target storage area is discontinuous storage areas, the controller determines that the first data block of the target data is to be stored in the first storage node, and determines, by division, a first storage area from the storage area of the target data in the memory to store the first data block. The first storage area is a storage area formed by multiple discontinuous storage areas. The controller determines that the second data block of the target data is to be stored in the second storage node, and determines, by division, a second storage area from the storage area of the target data in the memory to store the second data block. The first storage area is a storage area formed by multiple discontinuous storage areas.

In the scenario 2, an implementation of determining, by the controller, a corresponding sub storage area in the memory of the host for a data block of the target data is the same as that in the scenario 1. Details are not repeated herein.

After determining a sub storage area that is in the memory of the host and that is corresponding to a data block of the target data, the controller sends an instruction message to the target storage node, where the instruction message includes an identity of the data block that is of the target data and that is corresponding to the target storage node, an operation type, and a location parameter of the sub storage area determined for the data block. Then, the target storage node responds to the instruction message, and sends the data block of the target data to the host or obtains the data block of the target data from the host according to the location parameter of the sub storage area and using an RDMA connection to the host. Then, after sending the data block of the target data to the host or obtaining the data block of the target data from the host using the RDMA connection, the target storage node sends a data transmission success message to the controller. Finally, after receiving data transmission success messages sent by all target storage nodes, the controller sends an operation success message to the host.

In the scenario 2, after determining a sub storage area that is in the memory of the host and that is corresponding to a data block of the target data, the controller sends an instruction message to the target storage node, where the instruction message includes an identity of the data block that is of the target data and that is corresponding to the target storage node, an operation type, and a location parameter of the sub storage area determined for the data block. Then, the target storage node responds to the instruction message, and sends the data block of the target data to the host or obtains the data block of the target data from the host according to the location parameter of the sub storage area and using an RDMA connection to the host. Then, after sending the data block of the target data to the host or obtaining the data block of the target data from the host using the RDMA connection, the target storage node sends a data transmission success message to the controller. Then, after receiving data transmission success messages sent by the target storage node, the controller sends an operation success message to the host.

According to the foregoing solution, the controller can determine a corresponding sub storage area in the memory of the host for a data block of the target data such that a target storage node corresponding to the data block can obtain the data block from the host or send the data block to the host using an RDMA connection.

Figure 9:
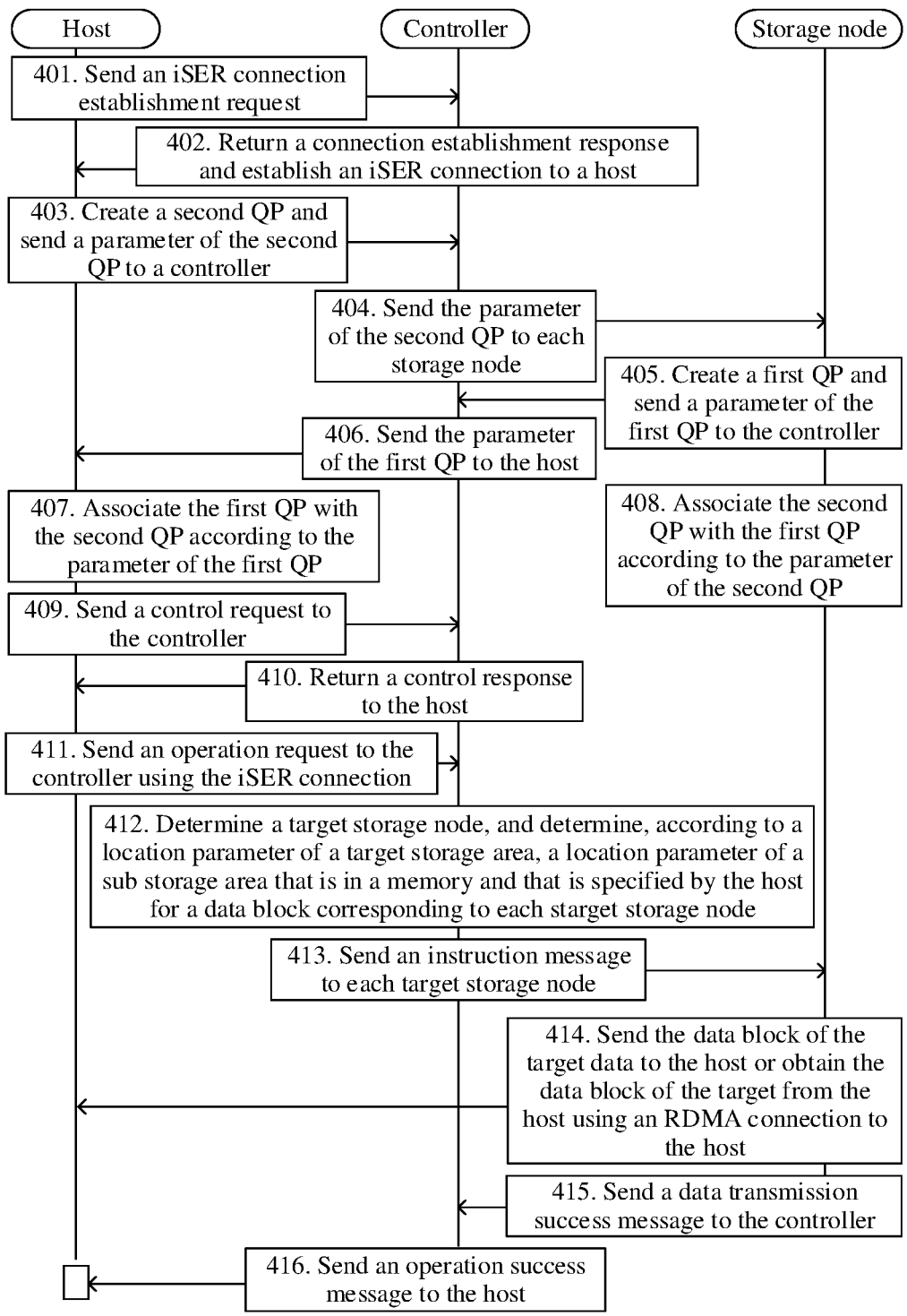
FIG. 9 is a schematic flowchart of transmitting target data between a host and a storage node using an Internet Small Computer Systems Interface (iSCSI) extensions for RDMA (iSER) connection according to an embodiment of the present application.

In a possible implementation, the following describes a process of a data processing method based on an iSER protocol with reference to FIG. 9, where the iSER protocol supports an RDMA connection. The process includes the following steps.

Step 401. A host sends an iSER connection establishment request to a controller.

Step 402. The controller returns a connection establishment response to the host and establishes an iSER connection to the host.

Step 403. The host creates a second QP, and sends a parameter of the second QP to the controller using the iSER connection to the controller.

Step 404. The controller sends the parameter of the second QP to each storage node using a first connection to the storage node.

Step 405. The storage node creates a first QP, and sends a parameter of the first QP to the controller using the first connection.

Step 406. The controller sends the parameter of the first QP to the host using the iSER connection.

Step 407. The host associates the first QP with the second QP according to the parameter of the first QP.

Step 408. The storage node associates the second QP with the first QP according to the parameter of the second QP.

Step 409. The host sends a control request to the controller using the iSER connection.

The control request is used to request the controller to allow the host to send, in an RDMA manner, a command request to the controller, such as an operation request in the following context. For a specific implementation of the control request, refer to the other approaches.

Step 410. The controller returns a control response to the host using the iSER connection.

The control response indicates that the controller allows the host to send, in the RDMA manner, the command request to the controller.

Step 411. The host sends an operation request to the controller using the iSER connection.

The operation request includes an operation type, an identity of to-be-operated target data, and a location parameter of a target storage area that is in a memory and that is specified by the host for the target data.

In a possible implementation, the operation request may not include the location parameter of the target storage area. After sending the operation request, the host sends the location parameter of the target storage area to the controller.

Step 412. The controller determines a target storage node according to the operation request, and determines, according to a location parameter of a target storage area, a location parameter of a sub storage area that is in a memory and that is specified by the host for a data block corresponding to each target storage node.

The controller determines, according to a locally stored partitioned view or global view, storage nodes in which the target data is stored or should be stored. The determined storage nodes are target storage nodes. Each target storage node stores one or more data blocks of the target data. Then, the controller divides a storage area that is in the memory of the host and that is configured to store the target data, and determines a storage area that is in the memory of the host and that is specified for a data block corresponding to each target storage node.

Step 413. The controller sends an instruction message to each target storage node, where the instruction message includes an identity of the data block corresponding to the target storage node, and the location parameter of the sub storage area determined for the target storage node.

Step 414. The target storage node responds to the instruction message, and sends the data block of the target data to the host or obtains the data block of the target data from the host using an RDMA connection to the host.

When an operation type in the instruction message is a write operation, the target storage node reads data from the sub storage area in an RDMA read manner according to the location parameter of the sub storage area in the instruction message, writes the data obtained by reading into a memory of the target storage node, writes the data from the memory into a magnetic disk, and records a storage location of the data in the magnetic disk, or when an operation type in the instruction message is a read operation, the target storage node writes, into the sub storage area in an RDMA write manner and according to the location parameter of the sub storage area in the instruction message, the data block that is of the target data and that is stored in the target storage node.

Step 415. After sending the target data to the host or obtaining the data block of the target data from the host using the RDMA connection, the target storage node sends a data transmission success message to the controller.

Step 416. After receiving a data transmission success message sent by each target storage node, the controller sends an operation success message to the host using the iSER connection.

In the foregoing process from step 401 to step 416, data is transmitted between the host and a storage node using an RDMA connection between the host and the storage node, and is not forwarded by the controller. Therefore, load of the controller is reduced, avoiding a other approaches problem that a speed of data transmission between a host and a storage node is relatively low because of excessively high load caused by data forwarding of the controller. In addition, when there are two or more target storage nodes, different storage nodes may simultaneously perform data transmission with the host using RDMA connections, further improving a rate of data transmission between the host and the storage nodes.

In another possible implementation, an NOF protocol also supports an RDMA connection. A process of a data processing method based on the NOF protocol is the same as the process from step 401 to step 416.

Still referring to FIG. 8B, different from the iSER protocol, the NOF protocol further supports that the host configures the target storage area in the memory as discontinuous. The host encapsulates the location parameter of the target storage area in a form of an SGL to obtain an SGL packet, and writes the SGL packet into a memory of the controller in the RDMA write manner. The controller parses the SGL packet, determines a location parameter of a sub storage area that is in the target storage area of the host and that is specified for a data block corresponding to each target storage node, encapsulates the location parameter of the sub storage area in a form of an SGL, and sends, to the storage node, the location parameter that is of the sub storage area and that is encapsulated in the form of an SGL. The storage node parses the encapsulated SGL packet, to obtain the location parameter of the sub storage area. According to the foregoing manner, when the host stores data in discrete storage areas in the memory, the data can be transmitted between the storage node and the host using the RDMA connection such that the host can fully use storage areas of the memory, thereby improving memory utilization.

(2) The third connection is a TCP/IP connection.

Both a host and a storage node include a communications port that supports a TCP/IP protocol. A communication link, that is, a third connection, can be established between the communications port of the host and the communications port of the storage node. In this embodiment of the present application, data can be transmitted between the host and the storage node using the third connection.

Figure 10:
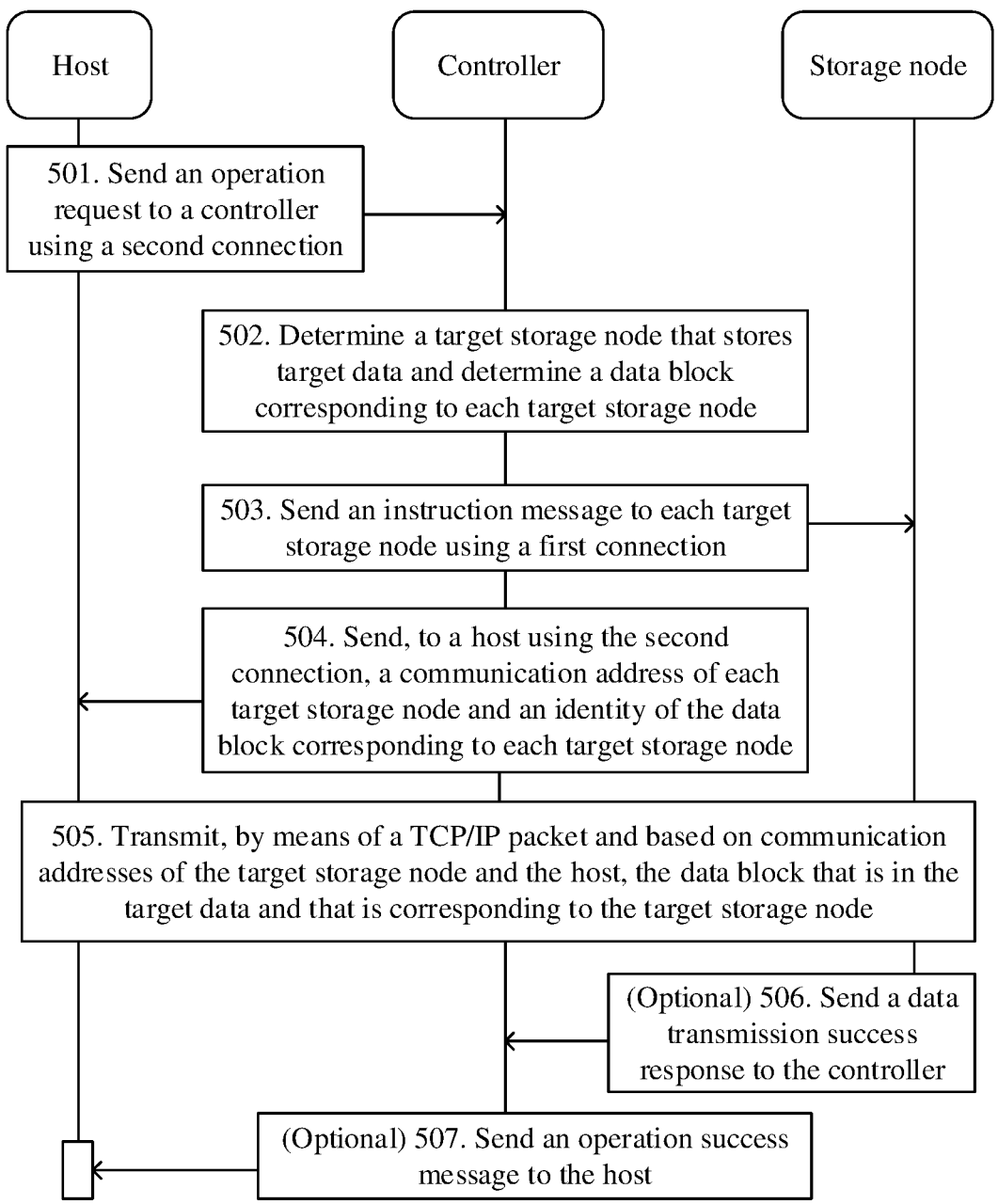
FIG. 10 is a schematic flowchart of a method for transmitting data between a host and a storage node using a TCP/IP connection according to an embodiment of the present application.

FIG. 10 is a schematic flowchart of a method for transmitting data between a host and a storage node when a third connection is a TCP/IP connection. The method includes the following steps.

Step 501. A host sends an operation request to a controller using a second connection, where the operation request includes an identity of target data and an operation type.

Step 502. The controller responds to the operation request, determines a target storage node that stores the target data, and determines a data block corresponding to each target storage node.

Step 503. The controller sends an instruction message to each target storage node using a first connection, where the instruction message includes a communication address of the host and an identity of a data block corresponding to the target storage node.

Further, the identity of the data block is used to enable the controller to determine, in a distributed system, a storage location of the target data in the storage node. Optionally, the identity may further include verification information, such as identity verification and data access license information.

Step 504. The controller sends, to the host using the second connection, a communication address of each target storage node and an identity of the data block corresponding to each target storage node.

The communication address may be an IP address or a Media Access Control (MAC) address. The controller may obtain the communication address of the host from the operation request sent by the host, and the controller may locally store a communication address of each storage node connected to the controller.

Step 505. The data block that is in the target data and that is corresponding to each target storage node is transmitted between the target storage node and the host by means of a TCP/IP packet and based on communication addresses of the target storage node and the host.

Further, step 505 may be implemented in multiple manners, including but not limited to the following manners.

Manner 1: The controller instructs the target storage node to initiate data transmission between the target storage node and the host.

For example, when the operation type in the operation request is a read operation, after determining each target storage node and the data block corresponding to each target storage node, the controller sends an instruction message to each target storage node. The instruction message includes the communication address of the host and an identity of the data block that the storage node needs to return. The storage node responds to the instruction message, and sends a TCP/IP packet destined for the host, where the TCP/IP packet includes the data block indicated by the instruction message. The controller has sent, to the host, the communication address of the target storage node and the identity of the data block corresponding to the target storage node. Therefore, when receiving the TCP/IP packet sent by the target storage node, the host may determine that the packet is a valid packet, determine that the data block included in the TCP/IP packet is a data block of the target data, and obtain the data block from the TCP/IP packet. After receiving a TCP/IP packet sent by each target storage node, the host may obtain the target data, thereby completing reading the target data from the storage node.

For another example, when the operation type in the operation request is a write operation, the storage node responds to an instruction message sent by the controller, and sends a TCP/IP read request packet to the host, where the TCP/IP read request packet includes an identity of the data block that the target storage node is responsible for storing. The host responds to the TCP/IP read request packet, and sends, to the storage node, a packet that carries the data block corresponding to the target storage node.

Manner 2: The controller instructs the host to initiate data transmission between the host and the target storage node.

In an aspect, the controller returns, to the host, the communication address of each target storage node and the identity of the data block that the target storage node is responsible for transmitting. After receiving the foregoing information, the host actively sends a data transmission request packet to the target storage node.

In another aspect, the controller sends an instruction message to each target storage node. The instruction message includes the communication address of the host and the identity of the to-be-operated data block. The instruction message is not used to instruct the target storage node to actively return data to the host, but is used to notify the target storage node of a valid data transmission requirement such that when receiving a data transmission request packet of the host, the target storage node identifies the data transmission request packet as a valid packet, responds to the packet, and performs data transmission with the host.

According to the foregoing solution, the to-be-operated data can be transmitted between the host and the storage node using the TCP/IP connection, and the data does not need to be forwarded by the controller. A problem that a data read/write rate of the host is relatively low because bandwidth of the controller cannot meet a transmission requirement of a large amount of data is avoided. In addition, a problem that the data read/write rate of the host is relatively low because a computing capability of the controller cannot meet a processing requirement of a large amount of data is avoided.

In a possible implementation, after step 505, the method further includes the following steps.

Step 506. After the data block of the target data is transmitted between the target storage node and the host using a TCP/IP connection, the target storage node sends a data transmission success response to the controller.

Step 507. After receiving data transmission success responses sent by all target storage nodes, the controller sends an operation success message to the host.

According to the foregoing solution, after a data transmission task of each target storage node is completed, the controller may send the operation success message to the host and notify the host of data read/write success such that the host determines data read/write success in time.

Figure 11:
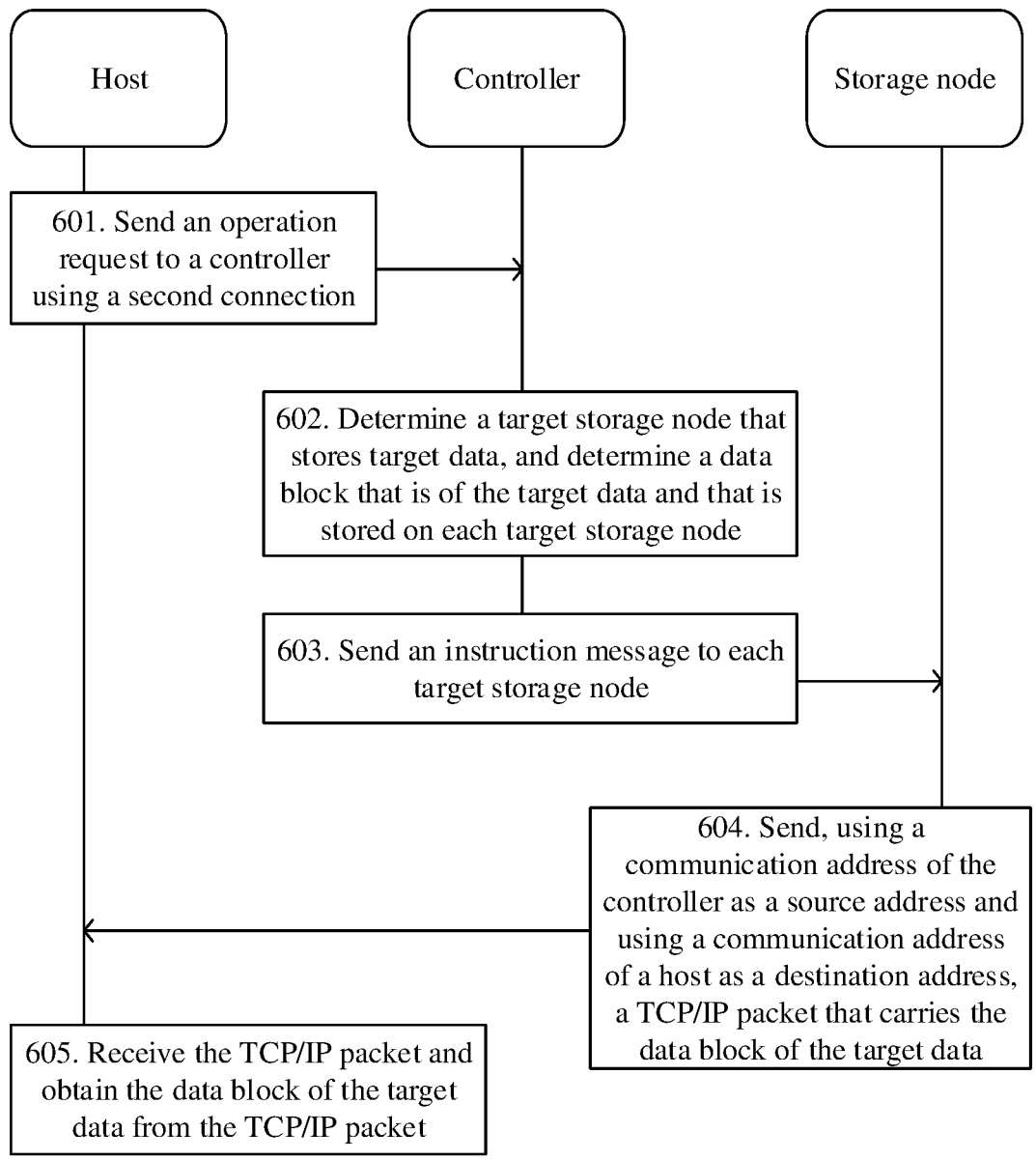
FIG. 11 is a schematic flowchart of another method for transmitting data between a host and a storage node using a TCP/IP connection according to an embodiment of the present application.

Next, with reference to FIG. 11, another data processing method provided in the present application when a third connection is a TCP/IP connection is further described. The method includes the following steps.

Step 601. A host sends an operation request to a controller using a second connection, where the operation request includes an identity of target data and an operation type, and the operation type is a read operation.

Step 602. The controller determines a target storage node that stores the target data, and determines a data block that is of the target data and that is stored in each target storage node.

Step 603. The controller sends an instruction message to each target storage node using a first connection, where the instruction message includes a communication address of the host, a communication address of the controller, and an identity of a data block stored in the target storage node.

In a possible manner, the controller determines a acceptable data amount of the host according to a TCP window size of the host, and determines, according to the acceptable data amount, a data block that is of the target data and that is added to each TCP/IP packet by the target storage node, where a size of the data block is not greater than the TCP window size of the host. Then, the controller generates the instruction message that includes an identity of the data block, and sends the instruction message to the target storage node.

The controller may determine a TCP window of the host in multiple manners. For example, the second connection between the host and the controller is a connection (such as an iSCSI connection) that supports TCP/IP. When the host establishes the second connection to the controller, the TCP window size is negotiated, and the controller determines the TCP window of the host. For another example, the host adds, to the TCP/IP packet sent to the controller, a size of a currently available TCP window of the host, and the controller determines the TCP window of the host from the TCP/IP packet.

For example, the controller determines, according to the TCP window, to send a 1000-byte data block to the host each time. Then, the controller determines a target storage node in which a first data block, with a length of 1000 bytes, of the target data is located, and sends an instruction message to the target storage node, to instruct the target storage node to send the 1000-byte data block to the host, after the 1000-byte data block is successfully sent, the controller instructs a target storage node in which a second data block, with a length of 1000 bytes, of the target data is located to send, to the host, the second data with a length of 1000 bytes, and so on, until target storage nodes send all of the target data to the host.

In a possible implementation, a length, determined by the controller, of a data block that is to be sent to the host each time may be different. This is because an available TCP window of the host dynamically changes. For example, the controller determines to send a first data block, with a length of 1000 bytes, of the target data to the host at the first time, and instructs a target storage node to send the 1000-byte data block to the host. Then, the controller determines to send a data block with a length of 800 bytes to the host at the second time, and instructs a target storage node that stores the data block with a length of 800 bytes to send the data block with a length of 800 bytes to the host, where the data block with a length of 800 bytes follows the first data block with a length of 1000 bytes.

In a possible implementation, the controller may simultaneously allocate the TCP window of the host to multiple target storage nodes. For example, the TCP window size of the host is 1000 bytes, a first data block, with a size of 450 bytes, of the target data is stored in a first target storage node, and a second data block, with a size of 500 bytes, of the target data is stored in a second target storage node. The controller may simultaneously send instruction messages to the first target storage node and the second target storage node, to instruct the first target storage node to send the first data block to the host, and instruct the second target storage node to send the second data block to the host. Because a sum of sizes of the first data block and the second data block is not greater than the TCP window size of the host, the host can successfully receive the first data block and the second data block. According to the foregoing manner, the TCP window of the host can be fully used, thereby improving data transmission efficiency.

Step 604. The target storage node responds to the instruction message, and sends, using the communication address of the controller as a source address and using the communication address of the host as a destination address, a TCP/IP packet that carries the data block of the target data.

Figure 12:
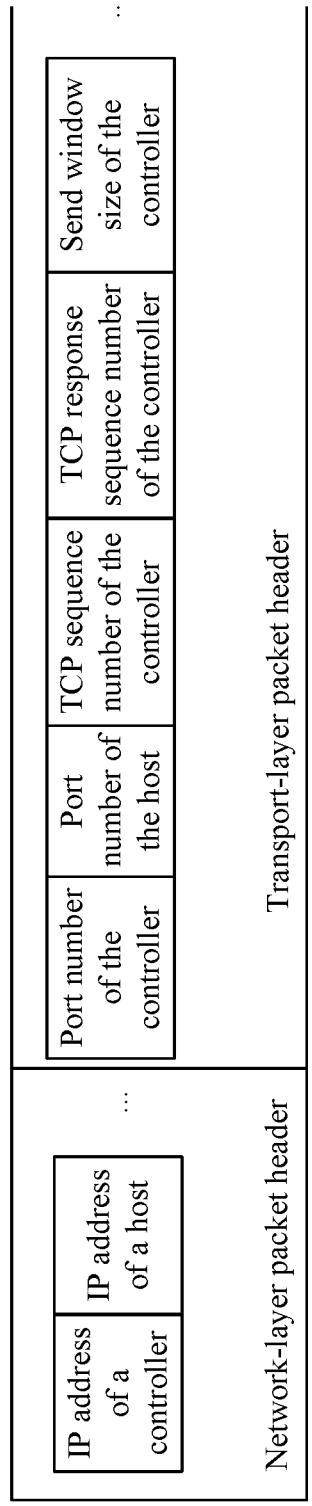
FIG. 12 is a schematic structural diagram of a frame of a packet sent by a storage node to a host according to an embodiment of the present application.

FIG. 12 is a schematic diagram of a network-layer packet header and a transport-layer packet header of the TCP/IP packet sent by the target storage node. The target storage node sets a source IP address in the network-layer packet header to an IP address of the controller, and sets parameters, such as a source port number, a TCP sequence number, a TCP response sequence number, and a send window size, in the transport-layer packet header to parameters of the controller. The controller may add the foregoing parameters to the instruction message sent to the target storage node such that the target storage node obtains the foregoing parameters.

Step 605. The host receives the TCP/IP packet that is sent by the target storage node and whose source address is the communication address of the controller, and obtains the data block of the target data from the TCP/IP packet.

Further, the controller instructs, at one time, one or more of all target storage nodes to send data blocks of the target data to the host. A sum of sizes of the data blocks is not greater than the TCP window size of the host. After receiving the data blocks, the host returns a data receiving response to the controller. After receiving the data receiving response, the controller determines that instruction messages sent to the target storage nodes are all successfully responded to, and continues to send an instruction message to one or more of all the target storage nodes, to instruct the one or more target storage nodes to separately send data blocks of the target data to the host. A sum of sizes of all the data blocks is not greater than the TCP window size of the host. According to the foregoing solution, the controller may control, according to the data receiving response message returned by the host, the target storage nodes to send the data blocks of the target data to the host in order, thereby ensuring data transmission accuracy.

With reference to the implementation described in the foregoing paragraph, if the controller does not receive the data receiving response message from the host in preset duration after sending an instruction message to a target storage node, the controller sends a retransmission instruction to the storage node, to instruct the storage node to resend data to the host. In this implementation, the foregoing retransmission mechanism ensures smooth data transmission.

According to the solution in step 601 to step 606, the storage node modifies a source address for sending a packet, and masquerades as the controller to send the TCP/IP packet that carries the data block of the target data to the host. The host identifies the TCP/IP packet as a data block that is of the target data and that is returned by the controller. The host can identify the TCP/IP packet sent by the storage node as a packet sent by the controller. Therefore, the storage node can directly send data to the host using a TCP/IP connection to the host, without changing the existing host and without a need of forwarding the data by the controller. A time consumed in sending the data from the target storage node to the host is reduced. In addition, a problem that a data read/write rate of the host is relatively low because bandwidth of the controller cannot meet a transmission requirement of a large amount of data is avoided. In addition, a problem that the data read/write rate of the host is relatively low because a computing capability of the controller cannot meet a processing requirement of a large amount of data is avoided. Further, because existing computer hardware and a working protocol of the hardware do not need to be changed, a cost is low.

Figure 13:
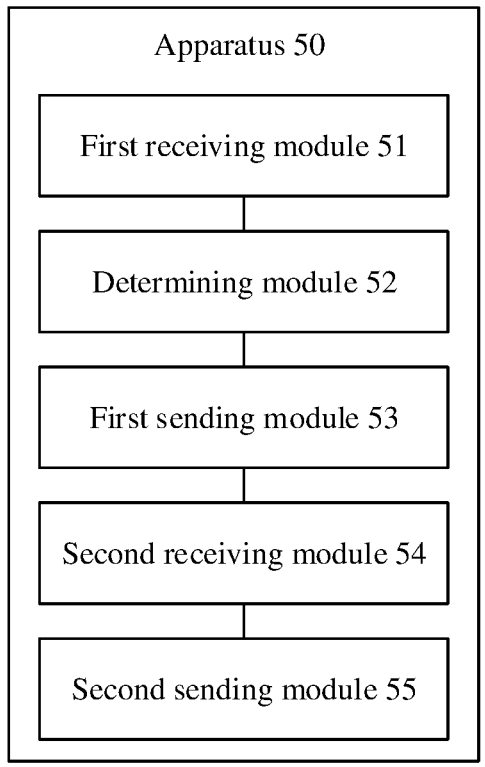
FIG. 13 is a schematic structural diagram of an apparatus according to an embodiment of the present application.

FIG. 13 shows a data processing apparatus 50 according to an embodiment of the present application. The apparatus 50 corresponds to the controller 20 in the data processing system shown in FIG. 3, and is configured to implement the functions of the controller in the data processing method in FIG. 4 to FIG. 12. The apparatus is configured to manage at least two storage nodes, and the apparatus 50 includes a first receiving module 51 configured to receive an operation request sent by a host, where the operation request includes an identity of to-be-operated target data and an operation type, a determining module 52 configured to determine at least one target storage node from the at least two storage nodes according to the identity of the target data, and a first sending module 53 configured to send an instruction message to the at least one target storage node, where the instruction message is used to instruct the at least one target storage node to send the target data to the host or obtain the target data from the host using a connection to the host.

It should be understood that the apparatus 50 in this embodiment of the present application may be implemented using an application-specific integrated circuit (ASIC), or may be implemented using a programmable logic device (PLD). The PLD may be a complex PLD (CPLD), a field programmable gate array (FPGA), generic array logic (GAL), or any combination thereof. Alternatively, when the data processing method shown in FIG. 4 to FIG. 12 is implemented by software, the apparatus 50 and the modules of the apparatus 50 may be software modules.

Optionally, the determining module 52 is configured to determine, according to the identity of the target data, that the target storage node includes a first storage node that stores a first data block of the target data and a second storage node that stores a second data block of the target data.

The first sending module 53 is further configured to send a first instruction message to the first storage node, where the first instruction message includes an identity of the first data block and is used to instruct the first storage node to send the first data block to the host or obtain the first data block from the host, and send a second instruction message to the second storage node, where the second instruction message includes an identity of the second data block and is used to instruct the second storage node to send the second data block to the host or obtain the second data block from the host.

Optionally, the operation request further includes a location parameter of a target storage area that is in a memory and that is specified by the host for the target data.

The determining module 52 is further configured to determine, according to the location parameter of the target storage area, a location parameter of a sub storage area specified for a data block that is of the target data and that is corresponding to each of the at least one target storage node, and generate the instruction message that includes an identity of the data block, the operation type, and the location parameter of the sub storage area, where the instruction message is used to instruct a target storage node that receives the instruction message to when the operation type is a read operation, write the data block of the target data into the sub storage area in the memory of the host according to the location parameter of the sub storage area and using an RDMA connection to the host, or when the operation type is a write operation, read the data block of the target data from the sub storage area in the memory of the host according to the location parameter of the sub storage area and using an RDMA connection to the host, and store the data block.

Optionally, the apparatus 50 further includes a second receiving module 54 and a second sending module 55.

The second receiving module 54 is configured to receive, from any storage node of the at least two storage nodes, a parameter of a first QP created by the any storage node.

The second sending module 55 is configured to send the parameter of the first QP to the host.

The first receiving module 51 is further configured to receive, from the host, a parameter of a second QP created by the host.

The first sending module 53 is further configured to send the parameter of the second QP to the any storage node.

Optionally, a connection between the apparatus 50 and the host is a TCP/IP connection. The instruction message includes the operation type, a communication address of the host, and the identity of the target data. The apparatus 50 further includes a second sending module 55 configured to send a third instruction message to the host, where the third instruction message includes a communication address of one target storage node and is used to instruct the host to send the target data to the target storage node or obtain the target data from the target storage node using a TCP/IP connection to the target storage node.

Optionally, a connection between the apparatus 50 and the host is a TCP/IP connection. The operation type is a read operation. The instruction message includes the operation type, a communication address of the host, a communication address of the apparatus 50, and the identity of the target data. The instruction message is used to instruct the target storage node to send, using the communication address of the apparatus 50 as a source address and using the communication address of the host as a destination address, a TCP/IP packet that carries the target data.

Optionally, the determining module 52 is further configured to determine a acceptable data amount of the host according to a TCP window size of the host, determine, according to the acceptable data amount, a data block that is of the target data and that is added to each TCP/IP packet by each of the at least one target storage node, and generate the instruction message that includes an identity of the data block, where the instruction message is used to instruct a target storage node that receives the instruction message to send the data block to the host.

Implementations of the modules of the apparatus 50 are the same as the implementations of the steps performed by the controller in the data processing method corresponding to FIG. 4 to FIG. 12. Details are not repeated herein.

Figure 14:
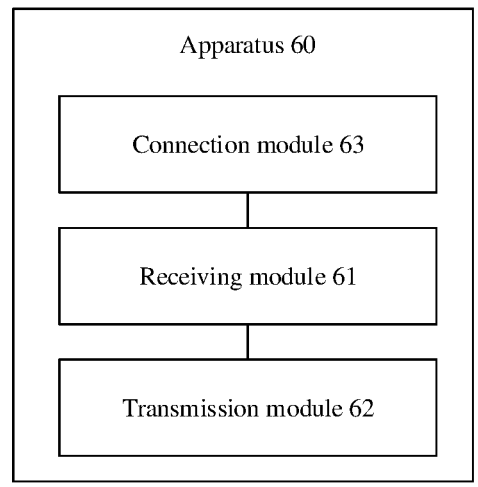
FIG. 14 is a schematic structural diagram of an apparatus according to an embodiment of the present application.

FIG. 14 shows a data processing apparatus 60 according to an embodiment of the present application. The apparatus 60 is configured to implement the functions of the storage node in the data processing method in FIG. 4 to FIG. 12. The apparatus 60 connects to and communicates with a controller. The controller is configured to manage the apparatus 60. The apparatus 60 includes a receiving module 61 configured to receive an instruction message sent by the controller, where the instruction message includes an identity of to-be-operated target data of a host and an operation type, and a transmission module 62 configured to send the target data to the host or obtain the target data from the host according to the instruction message and using a connection to the host.

Optionally, the apparatus 60 further includes a connection module 63 configured to create a first QP, where the first QP includes a first SQ and a first RQ, send a parameter of the first QP to the controller, receive, from the controller, a parameter of a second QP created by the host, where the second QP includes a second SQ and a second RQ, and bind the first SQ to the second RQ of the second QP and bind the first RQ to the second SQ according to the parameter of the first QP and the parameter of the second QP in order to establish an RDMA connection to the host.

Optionally, the instruction message includes the identity of the target data, the operation type, and a location parameter of a target storage area in a memory of the host.

The transmission module 62 is configured to when the operation type is a read operation, write the target data into the target storage area in the memory of the host using the RDMA connection to the host, or when the operation type is a write operation, read the target data from the target storage area in the memory of the host using the RDMA connection to the host, and store the target data.

Optionally, the instruction message includes the operation type, a communication address of the host, a communication address of the controller, and the identity of the target data.

The transmission module 62 is configured to send, using the communication address of the controller as a source address and using the communication address of the host as a destination address, a TCP/IP packet that carries the target data.

Implementations of the modules of the apparatus 60 are the same as the implementations of the steps performed by the storage node in the data processing method corresponding to FIG. 4 to FIG. 12. Details are not described herein again.

Figure 15:
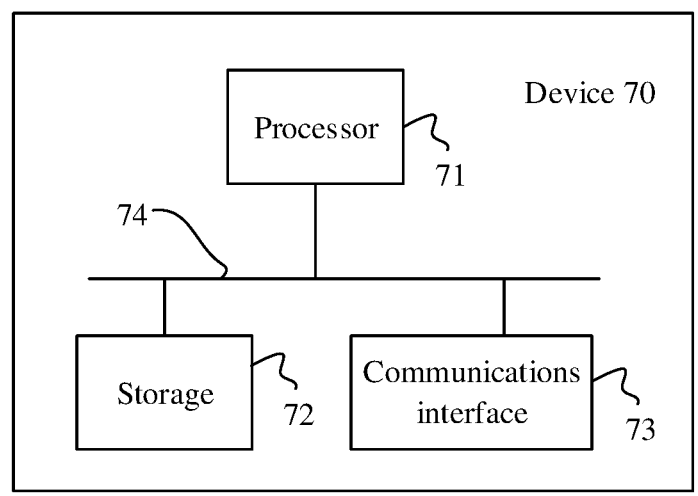
FIG. 15 is a schematic structural diagram of a device according to an embodiment of the present application.

FIG. 15 shows a data processing device 70 according to an embodiment of the present application. The device 70 is configured to implement the functions of the controller in the data processing method in FIG. 4 to FIG. 12. The device 70 includes a processor 71, a storage 72, a communications interface 73, and a bus 74. The processor 71, the storage 72, and the communications interface 73 connect to and communicate with each other using the bus 74. The storage 72 is configured to store a computer-executable instruction. When the device 70 runs, the processor 71 executes the computer-executable instruction in the storage 72 to perform, using a hardware resource on the device, the steps performed by the controller in the data processing method corresponding to FIG. 4 to FIG. 12.

The processor 71 may include a processing unit, or may include multiple processing units. For example, the processor 71 may be a CPU, or may be an ASIC, or may be configured as one or more integrated circuits that implement this embodiment of the present application, for example, one or more digital signal processor (DSP), one or more microprocessors, or one or more FPGAs.

The storage 72 may include one storage unit, or may include multiple storage units, and is configured to store executable program code, a parameter required for running of the device 70, data, and the like. In addition, the storage 72 may include a random access memory (RAM), or may include an NVM, such as a magnetic disk storage or a flash memory. In some embodiments, the communications interface 73 may be an interface that supports a TCP/IP protocol. In other embodiments, the communications interface 73 may be an interface that supports an RDMA protocol.

The bus 74 may be an industry standard architecture (ISA) bus, a Peripheral Component Interconnect (PCI) bus, an extended ISA (EISA) bus, or the like. The bus 74 may be classified into an address bus, a data bus, a control bus, and the like. For ease of representation, the bus is represented using only one line in the figure. However, it does not mean that there is only one bus or one type of bus.

It should be understood that the data processing device 70 according to this embodiment of the present application may be corresponding to the apparatus 50 in the embodiment of the present application, and may correspondingly execute a corresponding process of the operation steps performed by the controller in the data processing method in FIG. 4 to FIG. 12 in the embodiments of the present application. For brevity, details are not described herein again.

All or some of the foregoing embodiments may be implemented using software, hardware, firmware, or any other combination. When the software is used for implementation, all or some of the foregoing embodiments may be implemented in a form of a computer program product. The computer program product includes one or more computer instructions. When the computer program instructions are loaded or executed on a computer, all or some of the processes or functions in the embodiments of the present application are generated. The computer may be a general-purpose computer, a dedicated computer, a computer network, or another programmable apparatus. The computer instructions may be stored in a computer-readable storage medium, or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any available medium accessible to a computer, or a data storage device including one or more available medium sets, such as a server or a data center. The available medium may be a magnetic medium (for example, a FLOPPY DISK, a hard disk, or a magnetic tape), an optical medium (for example, a digital versatile disc (DVD)), a semiconductor medium (for example, a solid state disk (SSD)), or the like.

An embodiment of the present application further provides a storage device configured to execute the functions of the storage node in the data processing method in FIG. 4 to FIG. 12. For a structure of the storage device, still refer to FIG. 15. The device includes a processor, a storage, a communications interface, and a bus. The processor, the storage, and the communications interface connect to and communicate with each other using the bus. The storage is configured to store a computer-executable instruction. When the device runs, the processor executes the computer-executable instruction in the storage to perform, using a hardware resource on the device, the steps performed by the storage node in the data processing method corresponding to FIG. 4 to FIG. 12.

The data processing method provided in the embodiments of the present application may be applied to a distributed storage system, and may also be applied to a non-distributed storage array. The following first describes a other approaches technical solution in which a host reads target data from a storage array or writes target data into a storage array.

Figure 16:
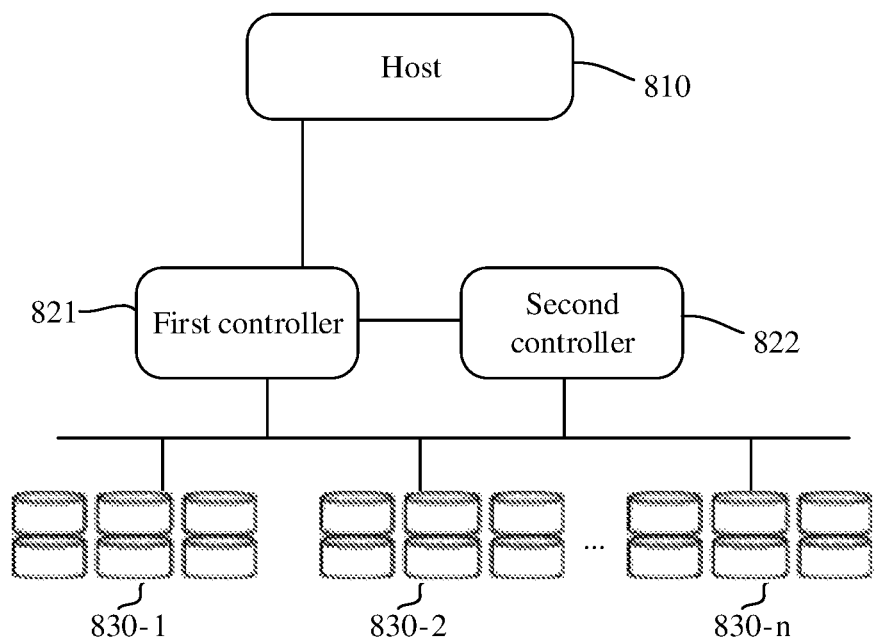
FIG. 16 is a block diagram of a system of a storage array.

FIG. 16 is a block diagram of a system of a storage array. As shown in FIG. 16, the system includes a host 810, a first controller 821, a second controller 822, and multiple magnetic disks, such as magnetic disks 830-1, 830-2, . . . , and 830-*n*. The first controller 821 and the second controller 822 are configured to manage the multiple magnetic disks, and provide the host 810 with a service of accessing data in the magnetic disks. The first controller 821 and the second controller 822 may work in an active/standby mode. That is, at a same moment, only one controller is in an active state, is responsible for receiving an operation request of the host, and handles the operation request, including directly transmitting target data with the host, or forwarding the operation request to a secondary controller such that the secondary controller performs data processing. Alternatively, no primary or secondary controller is distinguished between the first controller 821 and the second controller 822. Both the first controller 821 and the second controller 822 can receive an operation request sent by the host, and handle the operation request.

In the other approaches, a procedure of accessing the data in the magnetic disks by the host 810 is as follows.

When primary and secondary controllers are distinguished among multiple controllers that manage the multiple magnetic disks, the host 810 sends an operation request to a primary controller. When an operation type in the operation request is a read operation, the primary controller reads, from a magnetic disk according to a preset algorithm, target data that is requested, in the operation request, to be operated, and returns the target data to the host, or when an operation type in the operation request is a write operation, the primary controller determines, according to a preset algorithm, a target storage location, in a magnetic disk, of target data that is carried in the operation request, and writes the target data into the determined target storage location.

When no primary or secondary controller is distinguished among multiple controllers that manage the multiple magnetic disks, the host 810 may send an operation request to any controller. Alternatively, the host 810 determines a controller that manages a LUN of target data, and sends an operation request to the controller. In the foregoing two cases, a manner of data transmission between the controller and the host is the same as a manner of data transmission between the host and the primary controller in the foregoing paragraph.

However, when a controller (such as the first controller 821) that receives the operation request sent by the host 810 cannot process the target data for the host, for example, when a link between the first controller and a magnetic disk fails, the first controller 821 needs to forward the operation request of the host 810 to another controller that manages the multiple magnetic disks, such as the second controller 822, for processing. The second controller 822 receives the operation request forwarded by the first controller, and processes the target data for the host 810.

A procedure in which the second controller 822 processes the target data for the host 810 includes, when an operation type in the operation request is a read operation, the second controller 822 reads the target data from at least one magnetic disk (such as the magnetic disk 830-1), and sends the target data to the first controller 821, and the first controller 821 returns the target data to the host 810, or when an operation type in the operation request is a write operation, the first controller 821 obtains the target data from the host 810, and sends the target data to the second controller 822, and the second controller 822 writes the target data into at least one magnetic disk.

It can be learned that when the controller that receives the operation request of the host cannot process the target data for the host, the other controller may process the target data for the host, however, the controller that receives the operation request of the host needs to be used for transmitting the target data between the host and the controller that is responsible for processing the target data. Consequently, a data transmission path is relatively long, and a time consumed in data transmission is relatively long.

The present application further provides multiple embodiments to resolve the foregoing problem that the time consumed in data transmission is relatively long because the controller that is in the storage array and that receives the operation request of the host needs to forward the target data for the controller that is to process the target data.

Figure 17:
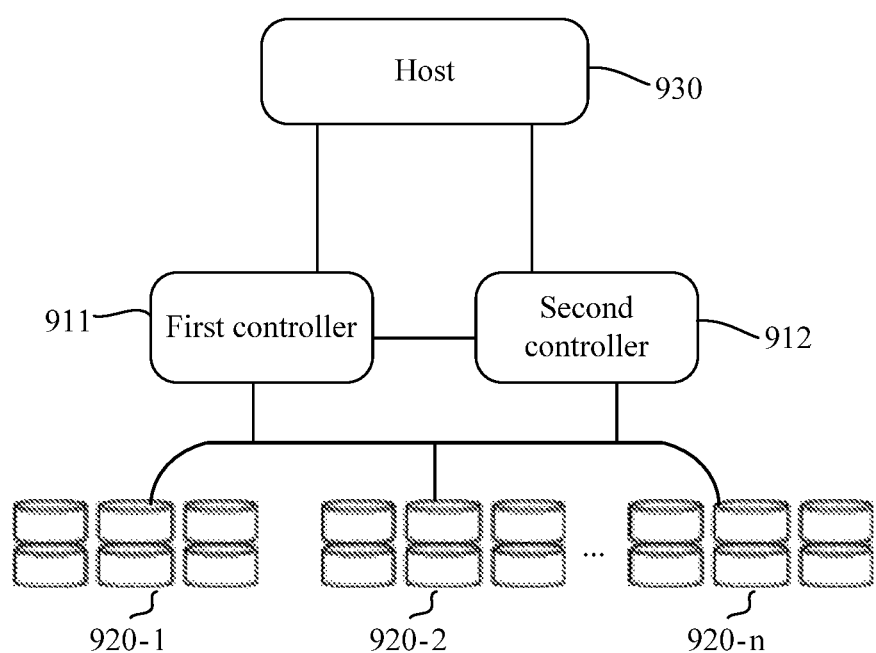
FIG. 17 is a block diagram of a system of a storage array according to an embodiment of the present application.

FIG. 17 is a block diagram of a system of a storage array according to an embodiment of the present application. The system includes at least two controllers and at least two magnetic disks. The at least two controllers may be a first controller 911 and a second controller 912 in FIG. 17. The at least two magnetic disks may be a magnetic disk 920-1, a magnetic disk 920-2, . . . , and a magnetic disk 920-*n* in FIG. 17.

Each of the at least two magnetic disks may be a mechanical magnetic disk, an SSD, a solid state hybrid drive (SSHD), or the like. Each LUN of the at least two magnetic disks may be homed to one controller. The at least two controllers and the at least two magnetic disks form the storage array. A host 930 may access, using a controller, target data of a LUN managed by the controller.

Each of the at least two controllers establishes an RDMA connection to the host 930. A procedure of establishing the RDMA connection is similar to the method described in step 201 to step 208. A difference lies in the method in step 201 to step 208, the controller synchronizes, for the host and the storage node between which the RDMA connection is established, parameters of QPs created by the host and the storage node, however, in this embodiment, the host 930 and a controller may send, to each other using a non-RDMA connection (such as a TCP/IP connection) between the host 930 and the controller, parameters of QPs created by the host 930 and the controller, and further associate, according to the parameters of the QPs, the QPs created by the host 930 and the controller in order to establish an RDMA connection.

Figure 18:
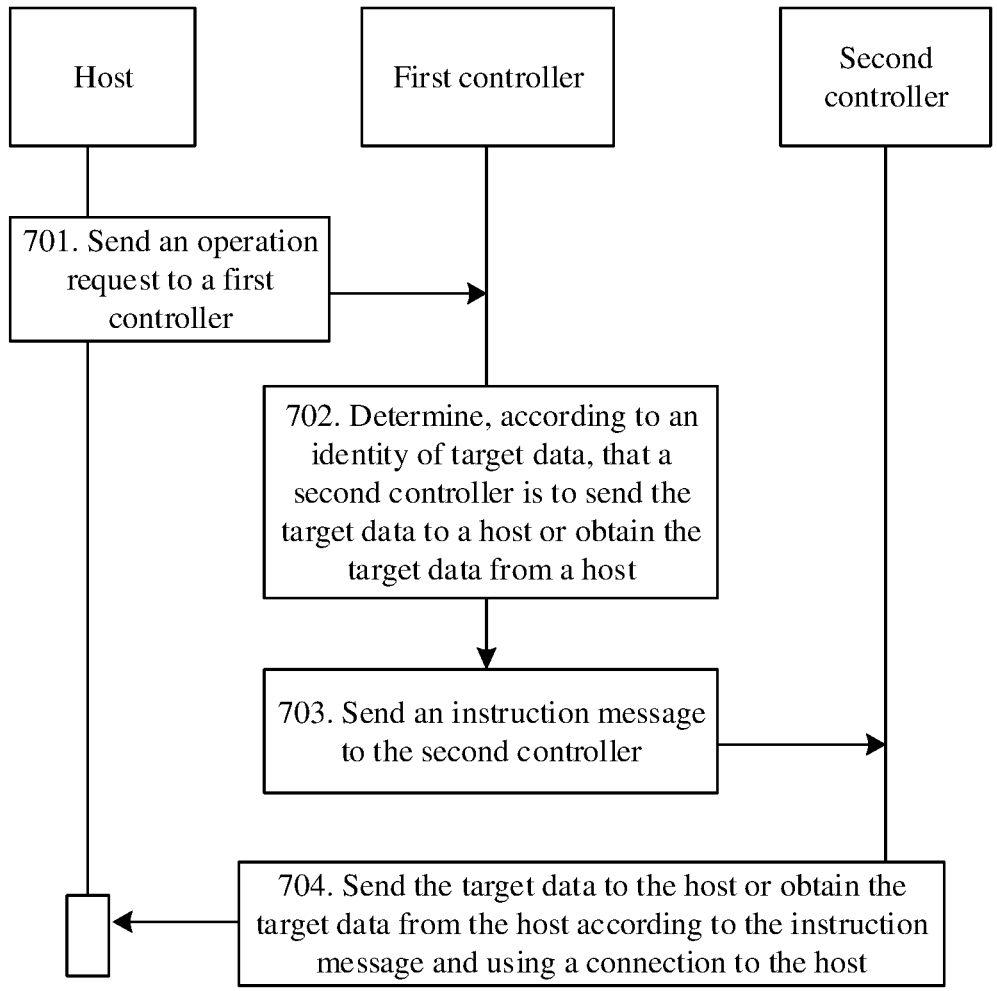
FIG. 18 is a schematic flowchart of a data processing method according to an embodiment of the present application.

With reference to the system shown in FIG. 17, an embodiment of the present application provides a data processing method. Referring to FIG. 18, the method includes the following steps.

Step 701. A host sends an operation request to a first controller, where the operation request includes an identity of to-be-operated target data and an operation type.

Further, the host records a mapping relationship between data and a controller that manages a LUN of the data. The host determines, according to the mapping relationship, a LUN that is of the target data and that is managed by the first controller. Therefore, the host sends the operation request to the first controller.

Optionally, the first controller is any controller in a storage array, and the host sends the operation request to the any controller in the storage array.

Optionally, the first controller is a primary controller in a storage array, and the host sends the operation request to the primary controller in the storage array.

Step 702. The first controller receives the operation request sent by the host, and determines, according to the identity of the target data, that a second controller of at least two controllers is to send the target data to the host or obtain the target data from the host.

The first controller may determine, in multiple manners, that the second controller is to send the target data to the host or obtain the target data from the host, and the multiple manners include but are not limited to the following manners.

Manner 1: The first controller determines, according to a preset load balancing policy, the second controller that is to send the target data to the host or obtain the target data from the host.

Further, the manner 1 may include the following implementations.

In a first implementation, the first controller is a primary controller. The primary controller is responsible for receiving the operation request of the host, and allocating, according to a preset load balancing policy (such as polling or allocation to a secondary controller with least load) of a secondary controller, a secondary controller that is to respond to the operation request. The primary controller does not directly respond to the operation request of the host.

In a second implementation, with reference to the first implementation, a difference lies in the first controller, as a primary controller, responds to the operation request of the host when load of the first controller is not greater than a threshold, or when load of the first controller is greater than a threshold, allocates, according to load of a secondary controller, a secondary controller that is to respond to the operation request.

In a third implementation, no primary or secondary controller is distinguished in the storage array. Each controller stores load information of another controller. After load of the first controller that receives the operation request of the host exceeds a threshold, the first controller sends the operation request to another controller with least load currently.

In a fourth implementation, no primary or secondary controller is distinguished in the storage array. Each controller does not know load of another controller. After load of the first controller that receives the operation request of the host exceeds a threshold, the first controller sends the operation request to any other controller. If load of the second controller that receives the operation request does not exceed a threshold, the second controller responds to the operation request, or if load of the second controller that receives the operation request exceeds a threshold, the second controller forwards the operation request to another controller other than the first controller.

Manner 2: The first controller determines, according to homing of a LUN of the target data, the second controller that is to respond to the operation request.

After receiving the operation request, the first controller determines that the LUN of the target data is actually not managed by the first controller. The first controller determines the second controller that actually manages the LUN, and determines that the second controller that actually manages the LUN is to respond to the operation request of the host. A speed of accessing the target data by the second controller that manages the LUN of the target data is relatively high. Therefore, when the second controller sends the target data to the host or obtains the target data from the host, a time consumed in transmission of the target data can be reduced.

Manner 3: When the first controller cannot access the target data, the first controller determines, according to the foregoing manner 1 or manner 2, a primary controller that is to respond to the operation request of the host.

When a link between the first controller and a magnetic disk managed by the first controller fails, the first controller cannot read the target data from the magnetic disk or write the target data into the magnetic disk. The first controller determines, in the foregoing manner 1 or manner 2, that another controller is to respond to the operation request to ensure that the operation request of the host is still correctly responded to.

Step 703. The first controller sends an instruction message to the second controller.

The instruction message includes the identity of the target data, the operation type, and an identity of the host, and is used to instruct the second controller to send the target data to the host or obtain the target data from the host using a connection to the host.

Step 704. The second controller sends the target data to the host or obtains the target data from the host according to the instruction message and using a connection to the host.

The connection between the host and the second controller may be implemented in multiple manners, such as an RDMA connection, a TCP/IP connection, or a PCI Express (PCIe) connection.

According to the foregoing solution, the target data may be transmitted between the host and the second controller using the connection between the host and the second controller that is responsible for providing the host with a service of reading/writing the target data, and the target data does not need to be forwarded by the first controller that receives the operation request of the host, thereby shortening a length of a data transmission path and reducing a time consumed in transmission of the target data.

In a possible implementation, the first controller and the second controller separately establish RDMA connections to the host. The operation request sent by the host to the first controller includes the identity of the target data, the operation type, the identity of the host, and a location parameter of a target storage area that is in a memory and that is specified by the host for the target data. The operation request sent by the first controller to the second controller also includes the identity of the target data, the operation type, the identity of the host, and the location parameter.

A procedure in which the second controller sends the target data to the host or obtains the target data from the host according to the instruction message is as follows. When the operation type in the operation request of the host is a read operation, the second controller determines a magnetic disk on which the target data is located, reads the target data from the magnetic disk, determines the RDMA connection to the host according to the identity of the host, and writes, in the foregoing RDMA write manner, the target data into the target storage area in the memory of the host using the RDMA connection, or when the operation type in the operation request of the host is a write operation, the second controller determines the RDMA connection to the host according to the identity of the host, reads, in the foregoing RDMA read manner, the data from the target storage area in the memory of the host using the RDMA connection, determines a storage location of the target data in the magnetic disk according to a preset algorithm, and writes the target data into the magnetic disk.

According to the foregoing solution, the target data may be quickly transmitted between the host and the second controller using the RDMA connection established between the host and the second controller that is responsible for providing the host with a service of reading/writing the target data in order to implement high-rate data read/write.

It should be noted that the RDMA connection between the second controller and the host may be established before the second controller receives the instruction message sent by the first controller, or may be established after the second controller receives the instruction message.

In a possible implementation, the operation request of the host may be forwarded between controllers in the storage array for multiple times, and the target data is transmitted between the host and the last controller that receives the operation request.

For example, a third controller that manages at least two magnetic disks receives a second operation request sent by the host, where the second operation request includes an identity of third to-be-operated target data of the host and an operation type. The third controller determines, according to the manner in step 702, that the third target data is to be transmitted between the first controller and the host. The third controller sends an instruction message to the first controller, where the instruction message includes the identity of the third to-be-operated target data of the host and the operation type.

After receiving the instruction message sent by the third controller, the first controller determines, according to the manner in step 702, that the second controller is to send the third target data to the host or obtain the third target data from the host. The first controller sends an instruction message to the second controller, where the instruction message is used to instruct to transmit the third target data between the second controller and the host.

The third target data is transmitted between the second controller and the host according to the instruction message sent by the first controller and using the connection to the host.

According to the foregoing solution, when the controllers forward the operation request of the host for two or more times, the target data can be still transmitted between the host and the second controller using the connection between the host and the second controller that is responsible for providing the host with a service of reading/writing the target data, thereby shortening a length of a data transmission path and reducing a time consumed in transmission of the target data.

Referring to FIG. 17, an embodiment of the present application further provides a data processing system. The system includes a first controller 911, a second controller 912, and multiple magnetic disks, such as a magnetic disk 920-1, a magnetic disk 920-2, . . . , and a magnetic disk 920-n, in FIG. 17. The first controller 911 and the second controller 912 are configured to execute the data processing method in step 701 to step 704, and are configured to transmit, using a direct link between a host and a controller that responds to an operation request of the host, target data between the controller and the host.

Figure 19:
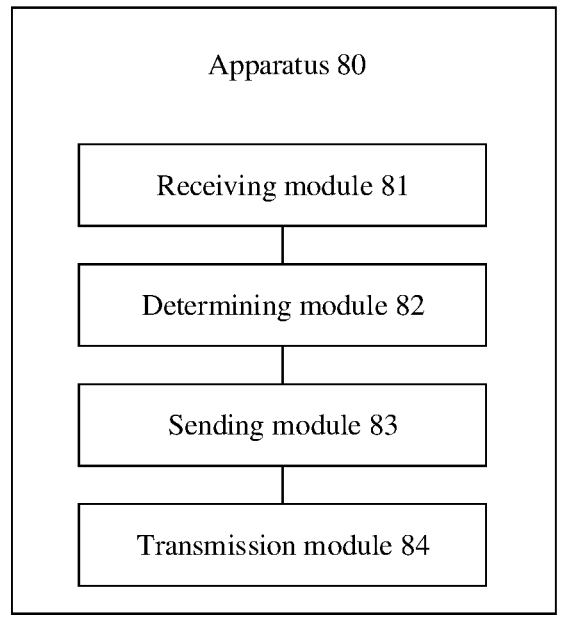
FIG. 19 is a schematic structural diagram of an apparatus according to an embodiment of the present application.

FIG. 19 shows a data processing apparatus 80 in an embodiment of the present application. The apparatus 80 is configured to implement functions of the first controller in the method in FIG. 18. The apparatus 80 is connected to a second controller and at least two magnetic disks. The apparatus 80 and the second controller are configured to manage the at least two magnetic disks. The apparatus includes a receiving module 81 configured to receive an operation request sent by a host, where the operation request includes an identity of to-be-operated target data and an operation type, a determining module 82 configured to determine that the second controller of the at least two controllers is to send the target data to the host or obtain the target data from the host, and a sending module 83 configured to send an instruction message to the second controller, where the instruction message is used to instruct the second controller to send the target data to the host or obtain the target data from the host using a connection to the host.

Optionally, the connection between the second controller and the host is an RDMA connection. The operation request further includes a location parameter of a target storage area in the host. The instruction message includes the identity of the target data, the operation type, and the location parameter. The instruction message is used to instruct the second controller to when the operation type is a read operation, obtain the target data from the at least two magnetic disks, and write the target data into the target storage area in a memory of the host using the RDMA connection to the host, or when the operation type is a write operation, read the target data from the target storage area in a memory of the host using the RDMA connection to the host, and write the target data into the at least two magnetic disks.

Optionally, the determining module 82 is configured to determine, according to a preset load balancing policy, that the second controller is to send the target data to the host or obtain the target data from the host, or determine, according to homing of a LUN of the target data, that the second controller is to send the target data to the host or obtain the target data from the host.

Optionally, the receiving module 81 is further configured to receive an instruction message sent by a third controller that manages the at least two magnetic disks, where the instruction message sent by the third controller includes an identity of second to-be-operated target data of the host and an operation type.

The determining module 82 is further configured to determine the second target data according to the instruction message sent by the third controller.

The apparatus further includes a transmission module 84 configured to transmit the second target data with the host using a connection to the host.

Optionally, the receiving module 81 is further configured to receive a fifth instruction message of a fourth controller that manages the at least two magnetic disks, where the fifth instruction message includes an identity of third to-be-operated target data of the host and an operation type.

The determining module 82 is further configured to determine, according to the identity of the third target data, that the second controller is to send the target data to the host or obtain the target data from the host.

The sending module 83 is further configured to send a sixth instruction message to the second controller, where the sixth instruction message is used to instruct to transmit the third target data between the second controller and the host.

For implementations of the modules of the apparatus 80, refer to implementations of the steps performed by the first controller in the method shown in FIG. 18. Details are not described herein.

Figure 20:
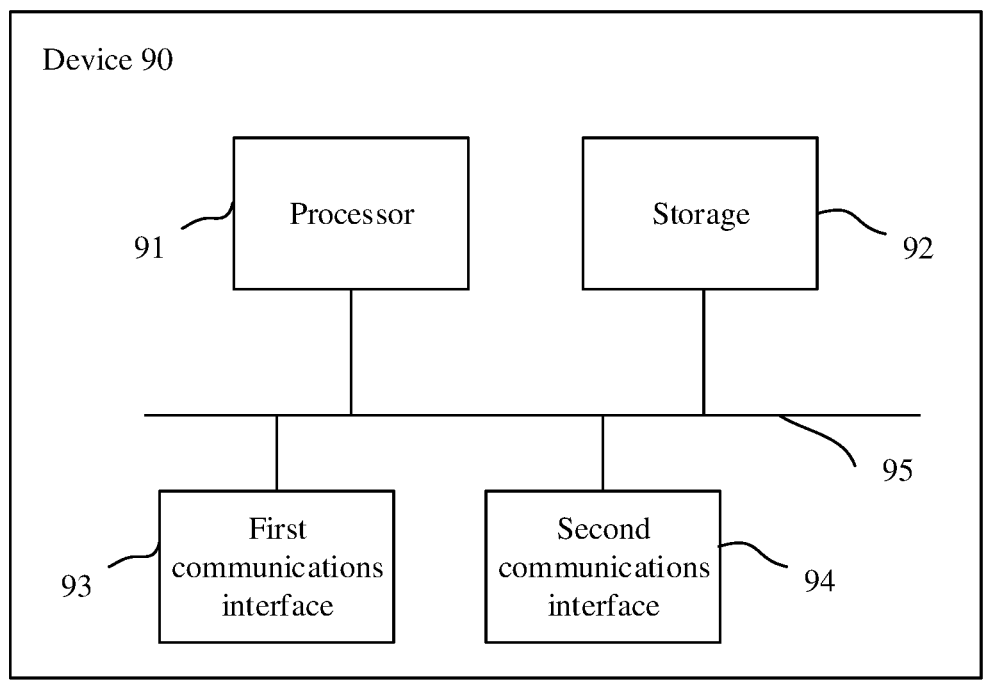
FIG. 20 is a schematic structural diagram of a device according to an embodiment of the present application.

FIG. 20 shows a data processing device 90 provided in an embodiment of the present application. The device 90 includes a processor 91, a storage 92, a first communications interface 93, a second communications interface 94, and a bus 95. The processor 91, the storage 92, the first communications interface 93, and the second communications interface 94 connect to and communicate with each other using the bus 95. The storage 92 is configured to store a computer-executable instruction. The first communications interface is configured to communicate with a host. The second communications interface is configured to communicate with at least two magnetic disks. When the device 90 runs, the processor 91 executes the computer-executable instruction in the storage 92, to execute, using a hardware resource on the device, the steps performed by the first controller in the data processing method shown in FIG. 18.

For a physical implementation of the processor 91, refer to the foregoing processor 71. For a physical implementation of the storage 92, refer to the foregoing storage 72. For a physical implementation of the bus 95, refer to the foregoing bus 74.

The second communications interface 93 may be an interface that supports an RDMA protocol, or may be an interface that supports a TCP/IP protocol, or may be an interface that supports an RDMA protocol in other embodiments.

The first communications interface 94 may be an interface that supports a PCIe protocol, or may be any other approaches interface configured to access a magnetic disk.

All or some of the foregoing embodiments may be implemented using software, hardware, firmware, or any other combination. When the software is used for implementation, all or some of the foregoing embodiments may be implemented in a form of a computer program product. The computer program product includes one or more computer instructions. When the computer program instructions are loaded or executed on a computer, all or some of the processes or functions in the embodiments of the present application are generated. The computer may be a general-purpose computer, a dedicated computer, a computer network, or another programmable apparatus. The computer instructions may be stored in a computer-readable storage medium, or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a DSL) or wireless (for example, infrared, radio, or microwave) manner. The computer-readable storage medium may be any available medium accessible to a computer, or a data storage device including one or more available medium sets, such as a server or a data center. The available medium may be a magnetic medium (for example, a FLOPPY DISK, a hard disk, or a magnetic tape), an optical medium (for example, a DVD), a semiconductor medium (for example, an SSD), or the like.

Obviously, a person skilled in the art can make various modifications and variations to this application without departing from the scope of this application. This application is intended to cover these modifications and variations of this application provided that they fall within the scope of protection defined by the following claims and their equivalent technologies.

What is claimed is:

1. A data processing system, comprising:
at least two storage nodes; and
a controller coupled to the at least two storage nodes and configured to:
receive an operation request from a host, wherein the operation request comprises an identity of target data and an operation type, and wherein the operation request further comprises a location parameter of a target storage area in a memory specified by the host for the target data;
determine at least one target storage node from the at least two storage nodes according to the identity of the target data; and
send an instruction message to the at least one target storage node, wherein the instruction message instructs the at least one target storage node to send the target data to the host or obtain the target data from the host,
wherein the at least one target storage node is configured to:
receive the instruction message from the controller;
establish a remote direct memory access (RDMA) coupling between the at least one target storage node and the host using a queue pair (QP) by:
creating a first send queue (SQ) and a first receive queue (RQ);
receiving, from the controller, a parameter of a second SQ and a second RQ created by the host and received by the controller from the host through a non-RDMA coupling between the controller and the host, wherein the non-RDMA coupling comprises a Transmission Control Protocol/Internet Protocol (TCP/IP) coupling between the host and the controller, and wherein the parameter of the second SQ and the second RQ is configured to establish the RDMA coupling between the target storage node and the host; and
binding, based on the parameter of the second SQ and the second RQ, the first SQ to the second RQ and the first RQ to the second SQ to establish the RDMA coupling to the host; and
send the target data to the host or obtain the target data from the host according to the instruction message through the RDMA coupling,
wherein the controller is further configured to:
determine, according to the identity of the target data, that the at least one target storage node comprises a first storage node storing a first data block of the target data and a second storage node storing a second data block of the target data;
send a first instruction message to the first storage node, wherein the first instruction message comprises an identity of the first data block and instructs the first storage node to send the first data block to the host or obtain the first data block from the host;
send a second instruction message to the second storage node, wherein the second instruction message comprises an identity of the second data block and instructs the second storage node to send the second data block to the host or obtain the second data block from the host;
determine, according to the location parameter of the target storage area, a location parameter of a sub storage area specified in the target storage area for a data block of the target data corresponding to the at least one target storage node; and generate the instruction message, wherein the instruction message comprises an identity of the data block, the operation type, and the location parameter of the sub storage area, and wherein the at least one target storage node is further configured to:

write the data block of the target data into the sub storage area in the memory of the host according to the location parameter of sub storage area using the RDMA coupling to the host when the operation type is a read operation; and read the data block of the target data from the sub storage area in the memory of the host according to the location parameter of the sub storage area using the RDMA coupling to the host, and store the data block when the operation type is a write operation.

2. The data processing system of claim 1, wherein the controller is further configured to send another instruction message to the host, and wherein the other instruction message comprises a communication address of the at least one target storage node and instructs the host to send the target data to the at least one target storage node or obtain the target data from the at least one target storage node using a TCP/IP coupling to the at least one target storage node.

3. The data processing system of claim 1, wherein the operation type is the read operation, wherein the instruction message comprises the operation type, a communication address of the host, a communication address of the controller, and the identity of the target data, and wherein sending the target data to the host or obtaining the target data from the host comprises the at least one target storage node being further configured to send, using the communication address of the controller as a source address and using the communication address of the host as a destination address, a TCP/IP packet carrying the target data.

4. The data processing system of claim 3, wherein the controller is further configured to:

determine an acceptable data amount of the host according to a TCP window size of the host;

determine, according to the acceptable data amount, a data block of the target data added to each TCP/IP packet by the at least one target storage node; and generate the instruction message comprising an identity of the data block.

5. The data processing system of claim 1, wherein each of the at least one target storage node is further configured to send a data transmission success message to the controller after sending the target data to the host or obtaining the target data from the host, and wherein the controller is further configured to send an operation success message to the host after receiving the data transmission success message.

6. A data processing method, wherein the data processing method is executed by a storage node, wherein the storage node communicates with a controller, wherein the controller is configured to manage the storage node, and wherein the data processing method comprises:

receiving, by the storage node, an instruction message from the controller, wherein the instruction message comprises an identity of target data of a host and an operation type;

creating, by the storage node, a first send queue (SQ) and a first receive queue (RQ);

receiving, by the storage node from the controller, a parameter of a second SQ and a second RQ created by the host and received by the controller from the host through a non-remote direct memory access (RDMA) coupling between the controller and the host, wherein the non-RDMA coupling comprises a Transmission Control Protocol/Internet Protocol (TCP/IP) coupling between the controller and the host, and wherein the parameter of the second SQ and the second RQ is configured to establish an RDMA coupling between the storage node and the host;

sending, by the storage node, a parameter of the first SQ and the first RQ to the controller;

binding, by the storage node based on the parameter of the second SQ and the second RQ, the first SQ to the second RQ and the first RQ to the second SQ to establish the RDMA coupling between the storage node and the host using a queue pair (QP); and sending, by the storage node, the target data to the host or obtaining the target data from the host according to the instruction message through the RDMA coupling.

7. The data processing method of claim 6, wherein the instruction message comprises the identity of the target data, the operation type, and a location parameter of a target storage area in a memory of the host, and wherein sending the target data to the host or obtaining the target data from the host comprises:

writing, by the storage node, the target data into the target storage area in the memory of the host using the RDMA coupling to the host when the operation type is a read operation; and reading, by the storage node, the target data from the target storage area in the memory of the host using the RDMA coupling to the host, and storing the target data when the operation type is a write operation.

8. The data processing method of claim 6, wherein the instruction message comprises the operation type, a communication address of the host, a communication address of the controller, and the identity of the target data, and wherein sending the target data to the host or obtaining the target data from the host comprises sending, by the storage node using the communication address of the controller as a source address and using the communication address of the host as a destination address, a TCP/IP packet carrying the target data.

9. The data processing system of claim 1, wherein the QP comprises a parameter of the first SQ and the first RQ used to establish the RDMA coupling.

10. The data processing system of claim 9, wherein the parameter of the first SQ and the first RQ comprises an identity of the QP.

11. The data processing system of claim 10, wherein the identity of the QP comprises a number.

12. The data processing system of claim 10, wherein the identity of the QP comprises a letter.

13. The data processing system of claim 10, wherein the identity of the QP comprises a combination of a letter and a number.

14. The data processing system of claim 1, wherein the QP comprises a first QP and a second QP, wherein the first QP comprises the first SQ and the first RQ, wherein the second QP comprises the second SQ and the second RQ, wherein the first QP is generated by the at least one target storage node, and wherein the second QP is generated by the host.

15. A storage node, comprising:

a memory configured to store instructions; and a processor coupled to the memory and configured to execute the instructions to cause the storage node to:

receive an instruction message from a controller, wherein the instruction message comprises an identity of target data of a host and an operation type;

create a first send queue (SQ) and a first receive queue (RQ);

receive, from the controller, a parameter of a second SQ and a second RQ created by the host and received by the controller from the host through a non-remote direct memory access (RDMA) coupling between the controller and the host, wherein the non-RDMA coupling comprises a Transmission Control Protocol/Internet Protocol (TCP/IP) coupling between the controller and the host, and wherein the parameter of the second SQ and the second RQ is configured to establish an RDMA coupling between the storage node and the host;

send a parameter of the first SQ and the first RQ to the controller;

bind, based on the parameter of the second SQ and the second RQ, the first SQ to the second RQ and the first RQ to the second SQ to establish the RDMA coupling between the storage node and the host using a queue pair (QP); and send the target data to the host or obtaining the target data from the host according to the instruction message through the RDMA coupling.

16. The storage node of claim 15, wherein the instruction message comprises the identity of the target data, the operation type, and a location parameter of a target storage area in a memory of the host.

17. The storage node of claim 16, wherein the instructions cause the storage node to send the target data to the host or obtaining the target data from the host comprises the instructions causing the storage node to write the target data into the target storage area in the memory of the host using the RDMA coupling to the host when the operation type is a read operation.

18. The storage node of claim 17, wherein the instructions cause the storage node to send the target data to the host or obtaining the target data from the host comprises the instructions causing the storage node to read the target data from the target storage area in the memory of the host using the RDMA coupling to the host and store the target data when the operation type is a write operation.

19. The storage node of claim 15, wherein the instruction message comprises the operation type, a communication address of the host, a communication address of the controller, and the identity of the target data.

20. The storage node of claim 19, wherein the instructions cause the storage node to send the target data to the host or obtaining the target data from the host comprises the instructions causing the storage node to send, using the communication address of the controller as a source address and using the communication address of the host as a destination address, a TCP/IP packet carrying the target data.

* * * * *